United States Patent [19]
Meunier

[11] Patent Number: 6,163,339
[45] Date of Patent: Dec. 19, 2000

[54] APPARATUS AND METHOD FOR CONVERTING AN OPTICAL IMAGE OF AN OBJECT INTO A DIGITAL REPRESENTATION

[76] Inventor: Jean-Francois Meunier, 4364 de la Cime, Cap-Rouge, Quebec, Canada, G1Y 2L8

[21] Appl. No.: 08/596,290

[22] PCT Filed: Jun. 17, 1994

[86] PCT No.: PCT/CA94/00347

§ 371 Date: Apr. 26, 1996

§ 102(e) Date: Apr. 26, 1996

[87] PCT Pub. No.: WO95/01045

PCT Pub. Date: Jan. 5, 1995

Related U.S. Application Data

[63] Continuation of application No. 08/262,132, Jun. 17, 1994, Pat. No. 5,569,907.

[30] Foreign Application Priority Data

Jun. 17, 1993 [CA] Canada .................................. 2098623

[51] Int. Cl.[7] .................................................... H04N 5/225
[52] U.S. Cl. ........................................ 348/218; 250/208.1
[58] Field of Search .......................... 348/218; 250/208.1

[56] References Cited

FOREIGN PATENT DOCUMENTS

WO 84/0246  5/1984  United Kingdom .

Primary Examiner—Andrew Faile
Assistant Examiner—Alicia M. Harrington

[57] ABSTRACT

An electronic apparatus for converting a visible image of an object into a digital representation of this visible image is described. The apparatus comprises a cartridge having a first portion through which light emitted from a visible image of an object enters into the cartridge, which comprises an array of focusing elements, each of which having a field of vision intersecting a given area of the visible image. Adjacent ones of these focusing elements have fields of vision intersecting common portions of the visible image, whereby substantially the entirety of the visible image is covered by combined fields of vision of focusing elements. The cartridge further compised an array of optical sensors arrays, each wich is optically associated with a respective one of the focusing elements. These optical sensors arrays produce groups of analog pixel signals representing partial images associated with corresponding areas of the visible image. The apparatus further comprises a controller interface and a computer controller for converting groups of digital pixel signals into composite digital pixel signals associated with the respective points of the visible image, thereby forming a composite digital representation of the visible image.

15 Claims, 15 Drawing Sheets

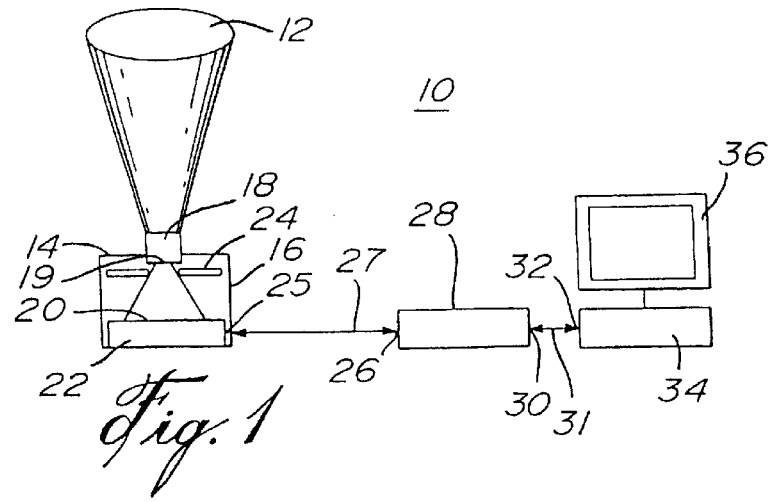
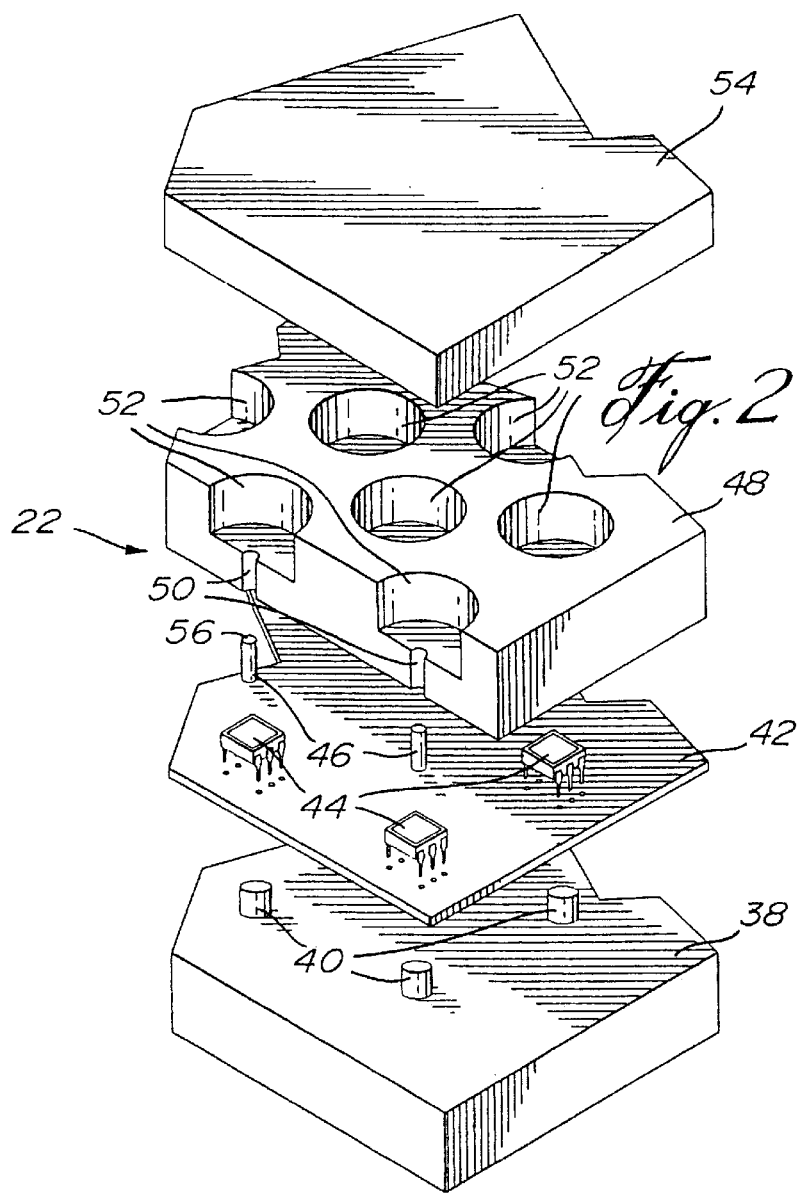

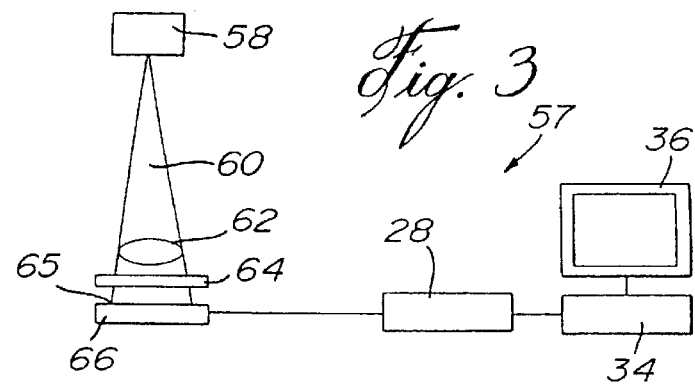
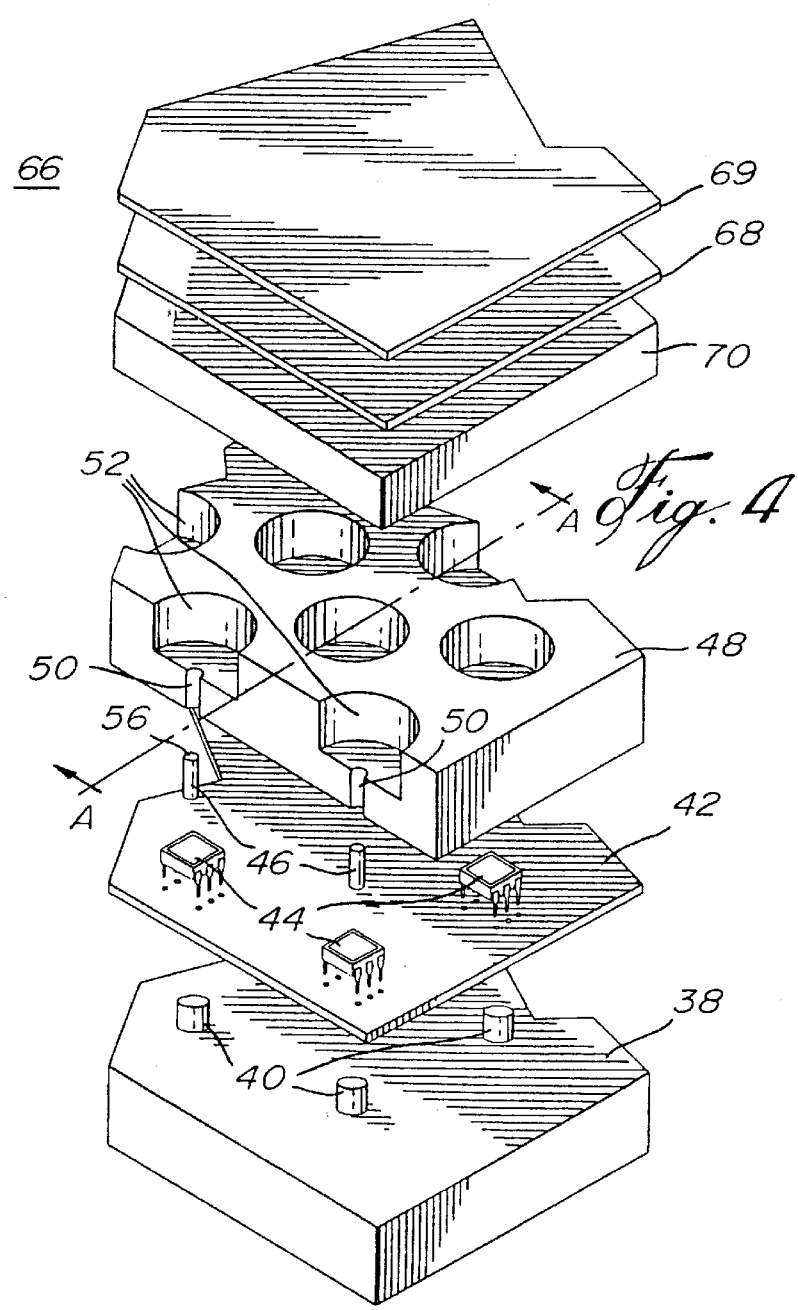

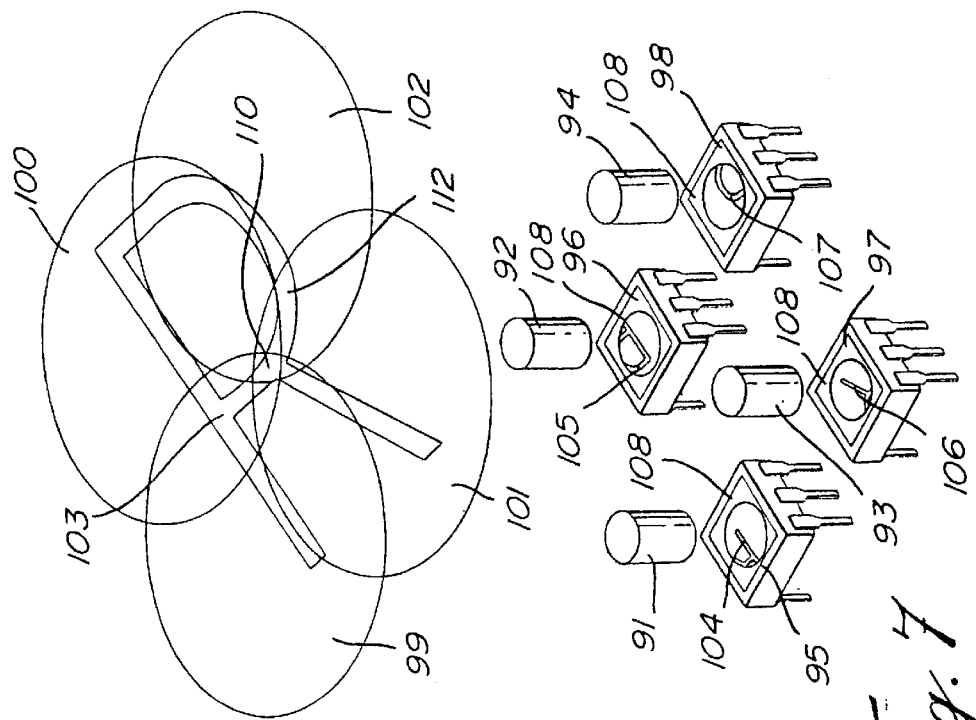
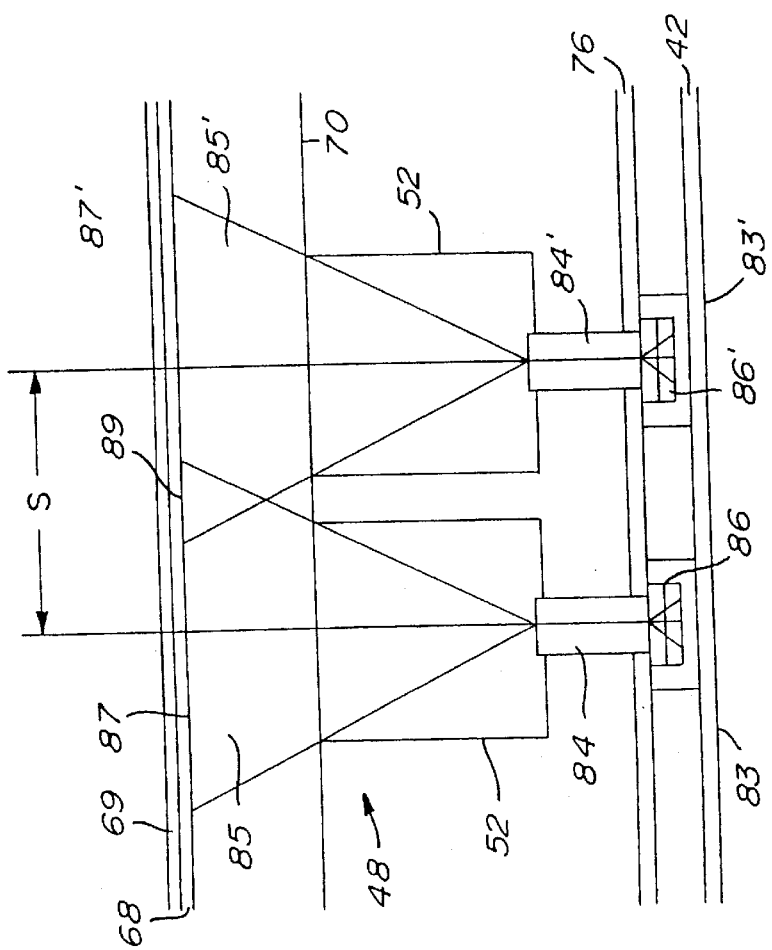
Fig. 7
Fig. 6

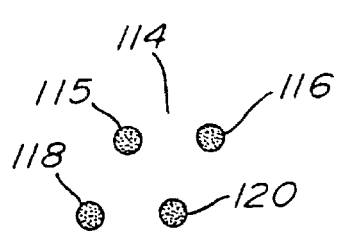
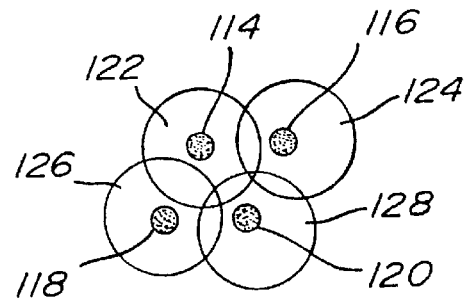
Fig. 10A  Fig. 10B
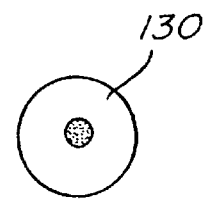 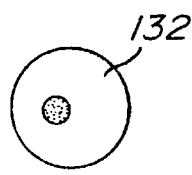 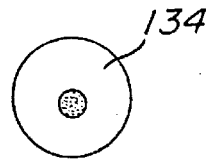 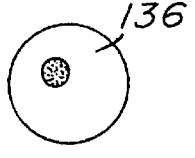
Fig. 11A  Fig. 11B  Fig. 11C  Fig. 11D
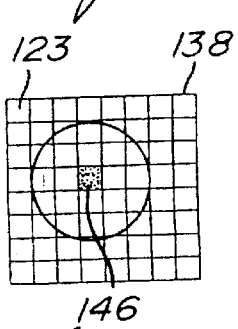 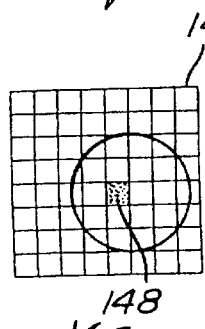 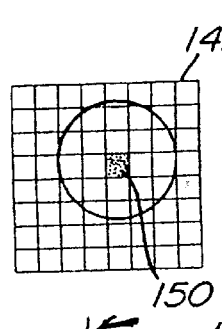 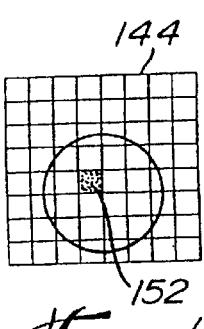
Fig. 12A  Fig. 12B  Fig. 12C  Fig. 12D
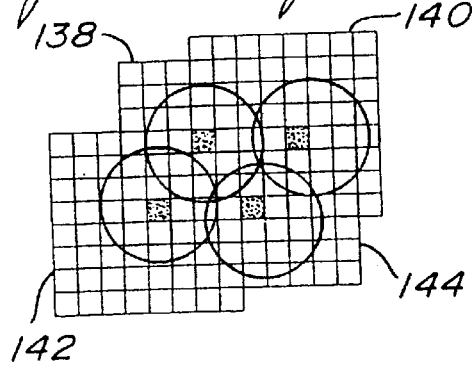 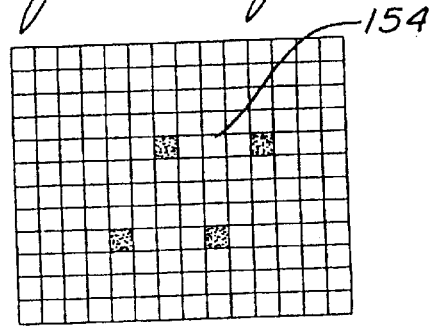
Fig. 13A  Fig. 13B

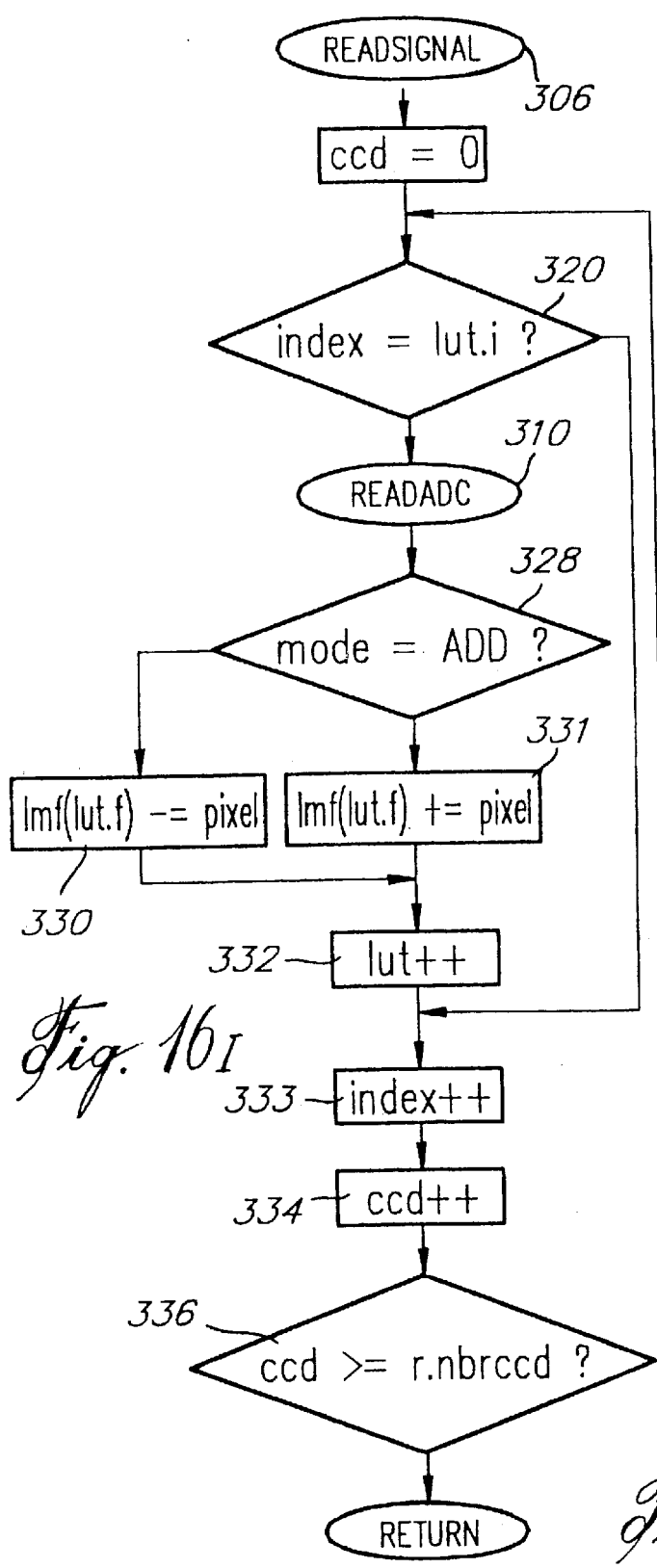
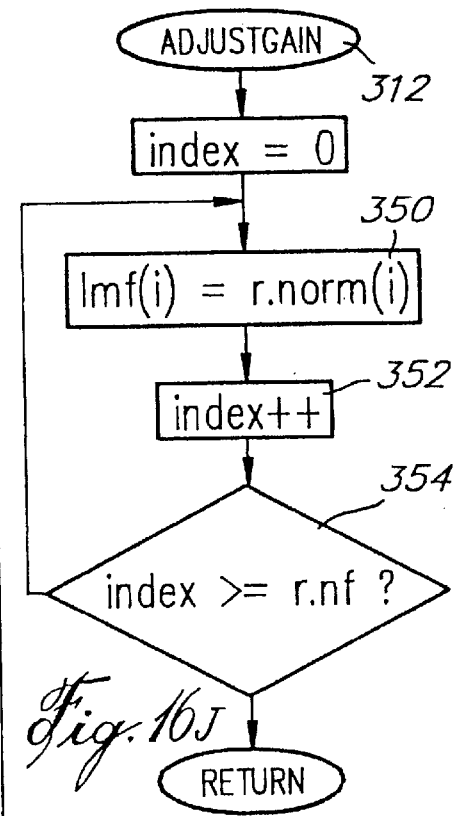
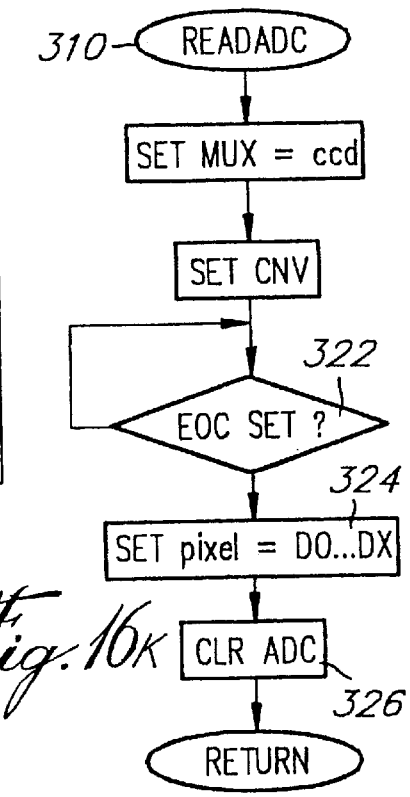

APPARATUS AND METHOD FOR CONVERTING AN OPTICAL IMAGE OF AN OBJECT INTO A DIGITAL REPRESENTATION

This application is a continuation of application Ser. No. 08/262,132, Jun. 17, 1994 now issued as U.S. Pat. No. 5,569,907.

FIELD OF INVENTION

This invention relates to an apparatus an method for converting an optical image of an object into a digital representation for further processing or displaying. More specifically, the present invention relates to X-ray imaging, wherein an optical image of an object produced by a fluorescent screen exposed to X-ray radiation is converted into a digital image representation.

BACKGROUND OF THE INVENTION

In recent years, various computerized imaging systems have been proposed to convert an optical image of an object into a digital representation, such systems finding applications in medical imaging, in non-destructive testing, in aerial photography, etc. These computerized imaging systems are gradually replacing the conventional radiographic film exposure systems on the marketplace.

Such a system is disclosed in U.S. Pat. No. 5,150,394 to Karellas, which comprises a X-ray source delivering a beam of x-ray radiation toward a subject's body and a fluorescent screen receiving radiation passing through the patient's body and thus producing an optical image of the tissues and structures therein. This apparatus further comprises a single focusing element provided for focusing light emitted from the fluorescent screen toward a single array of optical sensors (CCD sensors), which generates a discrete electronic representation of the image produced by the fluorescent screen. Such a system has important drawbacks. With a single focusing element as proposed by Karellas, only one large array comprising a relatively high number of optical sensors can be used, thereby requiring to read each sensor of such a large array sequentially in order to generate a final electronic image. The sequential reading of the sensors implying a reading time proportional to the number of sensors to be read, such a single array system cannot provide fast processing as required in many imaging applications. Furthermore, in order to provide imaging of large surfaces, although CCD arrays comprising many thousands of sensors are currently available on the marketplace, a larger area to be covered implies to separate further the focusing element from the object plane, thereby increasing overall dimensions of the image capture cartridge. The handling of such a cartridge and incorporation thereof into an x-ray exposing system could be rendered problematic due to large dimensions of such a cartridge.

In a second embodiment of his apparatus, Karellas teaches the use of a fiberoptic bundle for connecting adjacent areas of the image plane to the optical array. In order to increase the optical image surface covered by the apparatus while keeping the image resolution at an appropriate level, one can provide a plurality of fiberoptic bundles respectively connected to a plurality of optical sensors arrays, as disclosed in U.S. Pat. No. 5,159,455 to Cox. However, these fiberoptic bundles still cannot be integrated in a compact image capture cartridge. Moreover, the manufacturing of such a complex arrangement is critical, leading to increase the cost of such a system.

A different approach regarding the same problem is proposed by Yedid in U.S. Pat. No. 4,613,983, which consists of reconstructing a composite X-ray image from basic smaller images obtained by successive shots, using a source-receiver assembly displaceably movable along a predetermined path relative to a support for a body to be radiographed. Although such a system enlarges superficies of the optical image covered while keeping the resolution of the produced electronic image representation at an appropriate level, this system has the major drawback of requiring a plurality of successive exposure shots, leading to increase the time required to complete an image capture operation, and consequently increasing the risk that a movement of the patient's body during the capture operation causes a mismatch in the resulting composite image. Moreover, which such a system, the enlargement of the covered image superficies can be carried out only in the direction of displacement of the source-receiver assembly, thereby limiting the system capability to produce enhanced resolution images presenting regular dimensions.

Another conventional approach is discussed in U.S. Pat. No. 4,948,214 to Hamblen which consists of providing an array of focusing elements, each of these elements having a first end being optically coupled to a respective area of the optical image, and a second end optically connected to a respective one of a plurality of optical sensors arrays. However, in order to obtain appropriate image definition covering substantially all points of the optical image, while avoiding image overlapping, relatively large number of small diameter focusing elements are required, therefore requiring a large number of corresponding optical sensors arrays, leading to increase manufacturing costs. Moreover, this approach is generally limited to 1:1 magnification applications, thereby limiting the versatility afforded by this approach.

Another approach is disclosed in U.S. Pat. No. 4,349,248 to Rees, or in U.S. Pat. No. 4,512,632 to Tokomitsu, which consists of scanning an essentially linear array of focusing element relative to an object while transmitting the image thereof toward a corresponding linear array of optical sensors, and then reconstructing a complete electronic representation of the exposed object. While reducing the required number of focusing elements and associated optical sensors arrays, this approach is also generally limited to 1:1 magnification applications, and is characterized by a relatively slow image capture operation. Moreover, such a system incorporating electromechanical moving parts, it is relatively susceptible of mechanical failures.

In WO-A-84/02046, Ridge et al., dated May 24, 1984, there is disclosed a multi-camera system which permits the conversion of an optical image to a numeric representation. This system utilizes a plurality of cameras with focusing elements and detectors whereby to obtain a complete image of an object by a method which corrects the skew and the offset associated with each partial image. This patent however, does not teach or suggest to integrate focusing and detecting elements inside a cartridge. Furthermore, this reference does not utilize a conversion table in its method of correction. The method of correction has described in this reference consists in a first phase, the calibration utilizing a reference object having alignment points whereby to produce correct coordinates of the points of alignment. This first phase is realized by the use of sequential adjacent images until the corrected coordinates of all alignment points are calculated. In a second phase, the calculation of the corrected coordinates of each partial image of the camera is effected as a function of the corrected coordinates of the alignment points.

In WO-A-90/02466 to Bell Communication Reseach dated Mar. 8, 1990, there is described a system to obtain a final image having a high resolution but originating from partial images emanating from two video image sensing devices, each of which is formed by an optic sensor associated to a focal element, both sensors having a plan of vision which overlap. The final images obtained by cropping achieved by scanning the sensors in such a way as to eliminate the overlapping of their field of vision. Their methods of operation are different from that described herein.

SUMMARY OF INVENTION

It is therefore a feature of the present invention to provide an electronic apparatus for converting an optical image of an object into a digital representation, which can be integrated in a compact assembly.

Another feature of the present invention is to provide an electronic apparatus for converting an optical image of an object into a digital representation providing fast image generation.

Another feature of the present invention is to provide an electronic apparatus for converting an optical image of an object into a digital representation, which have the capabilities to cover a large optical image superficies while providing high imaging resolution.

Another feature of the present invention is to provide an electronic apparatus for converting an optical image of an object into a digital representation, which is relatively simple of construction and relatively inexpensive to manufacture.

Another feature of the present invention is to provide a reliable electronic apparatus for converting an optical image of an object into a digital representation, which comprises essentially no moving parts susceptible of mechanical failures.

Another feature of the present invention is to provide an electronic apparatus for converting an optical image of an object produced by an x-ray unit into a digital representation.

Another feature of the present invention is to provide a method for converting an optical image of an object into a digital representation.

According to the above features, from a broad aspect, the present invention provides an electronic apparatus for converting an optical image of an object into a digital representation of this optical image. The apparatus comprises a cartridge having a first portion through which light emitted from the optical image, which lies in a first plane, enters the cartridge during an exposure time, a second portion and a casing for attaching the first portion to the second portion. A two-dimensional array of focusing elements is also provided in the second portion, which lies in a second plane spaced from the optical image plane in a parallel relationship. Each of these focusing elements has a field of vision intersecting an area of the optical image, and adjacent ones of these focusing elements have fields of vision intersecting common portions of the optical image, whereby substantially the entirety of the optical image is covered by combined fields of vision of focusing elements. A two-dimensional array of optical sensors arrays are mounted on a board provided in the second cartridge portion and secured to the casing. This array of optical sensors arrays lies in a third plane spaced from the array of focusing elements in a parallel relationship. Each of these optical sensors arrays are optically associated with a respective one of the focusing elements, whereby at least a portion of light emitted from an area of the optical image corresponding with one of the focusing elements and traversing therethrough is focused onto the associated optical sensors array so as to ensure that light emitted from substantially each point of the optical image is focused on at least one of the optical sensors. Each optical sensors array integrates focused light during the exposure time to produces a group of analog pixel signals representing a partial image associated with the corresponding area of the optical image. The apparatus further comprises an analog to digital converter receiving each group of analog pixel signals corresponding with each optical sensors array to produce corresponding groups of digital pixel signals. A computer controller is provided which is responsive to said groups of digital pixel signals. This computer controller has a memory for storing a converting table establishing, for substantially each point of the optical image, at spatial relationship between he optical sensor upon which light emitted from a point is focused, and a corresponding point of a composite digital representation of the optical image. The computer controller forms the composite digital representation of the optical image by using the table to convert the groups of digital pixel signals into composite digital pixel signals associated with the respective points of the composite digital representation of the optical image.

According to a further broad aspect of the present invention, the apparatus comprises an X-ray source to deliver a beam of X-ray radiation toward the object. The first cartridge portion is provided with a fluorescent screen to receive the X-ray radiation traversing through the object, thereby producing the optical image of the object.

According to a still further broad aspect of the present invention, there is provided a method for converting an optical image of an object in a first plane into a digital representation of this optical image. Such a method uses a two-dimensional array of focusing elements lying in a second plane spaced form the image plane in a parallel relationship. Each of these focusing elements has a field of vision intersecting an area of said optical image, and adjacent ones of these focusing elements have fields of vision intersecting common portions of the optical image, whereby substantially the entirety of the optical image is covered by combined fields of vision of the focusing elements. The method further uses a two-dimensional array of optical sensors arrays mounted on a board, which array of optical sensors arrays lies on a plane positioned beneath the array of focusing elements. Each of these optical sensors arrays are optically associated with a respective focusing element, whereby at least a portion of light emitted during an exposure time from an area of the optical image corresponding with one of the focusing elements and traversing therethrough is focused onto the associated optical sensors array so as to ensure that light emitted from substantially each point of the optical image is focused on at least one of optical sensor. The method comprises providing a converting table establishing for substantially each point of the optical image a spatial relationship between the optical sensors upon which light emitted from each point is focused, and a corresponding point of a composite digital representation of the optical image. For each of the optical sensors arrays, a group of pixel analog signals representing a partial image associated with the corresponding area of the optical image are then produced. The Group of analog pixel signals associated with each optical sensors array are then converted to a corresponding group composite digital representation of the optical image is formed by using the table to convert the of digital pixel signals. The groups of digital pixel signals into composite digital pixel signals associated with respective points of the composite digital representation of the optical image.

BRIEF DESCRIPTION OF DRAWINGS

Preferred embodiments of the present invention will now be described with reference to the accompanying drawings in which:

FIG. 1 is a general schematic view of a first embodiment of the imaging apparatus for converting an optical image of an object into a digital representation according to this invention.

FIG. 2 is a partially cut away exploded view of the cartridge provided on the imaging apparatus as shown in FIG. 1.

FIG. 3 is a general schematic view of a second embodiment of the apparatus according to the present invention as an X-ray imaging system, which is provided with an X-ray source for delivering a beam of X-ray radiation toward the object and with a fluorescent screen cartridge to receive the X-ray radiation traversing through the object, thereby producing the optical image of the object.

FIG. 4 is a partially cut away exploded view of an example of the cartridge provided on the X-ray imaging apparatus according to the second embodiment as shown in FIG. 3.

FIG. 6 is a cross-sectional partial front view along line A-A' of FIG. 4 of the cartridge provided in the apparatus of the present invention showing two adjacent focusing-sensing subassemblies.

FIG. 7 is a partial perspective exploded view of the cartridge provided in the apparatus of the present invention showing four adjacent focusing elements with associated optical sensors arrays and object image areas covered by associated fields of view.

FIG. 10A is a plan view of an example of an example of an optical image to be converted as provided by the present invention.

FIG. 10B is a plan view of the optical image as shown in FIG. 10A showing segmentation of the optical image in four partial images according to overlapping fields of view of corresponding adjacent focusing elements.

FIGS. 11A to 11D are plan views of respective focused images corresponding with each partial images as shown in FIG. 10 B.

FIGS. 12A to 12D are plan view of resulting digitalization of focused partial images corresponding with partial images as shown in FIGS. 11A to 11B showing the position of digitized focused images with reference to a respective optical sensors array.

FIG. 13A is a plan view of digitized focused partial images as shown in FIG. 12A to 12D, which has been digitally reassembled according to the present invention.

FIG. 13*b* is a plan view of the final reconstituted image of the portion of the optical image as shown in FIG. 10A, which is a digital representation thereof.

FIGS. 16A to 16K are process flow diagrams of an example of the method according to this invention for the conversion of partial images data into a final digital representation of the initial optical image.

DETAILED PREFERRED EMBODIMENTS

Figure 5:
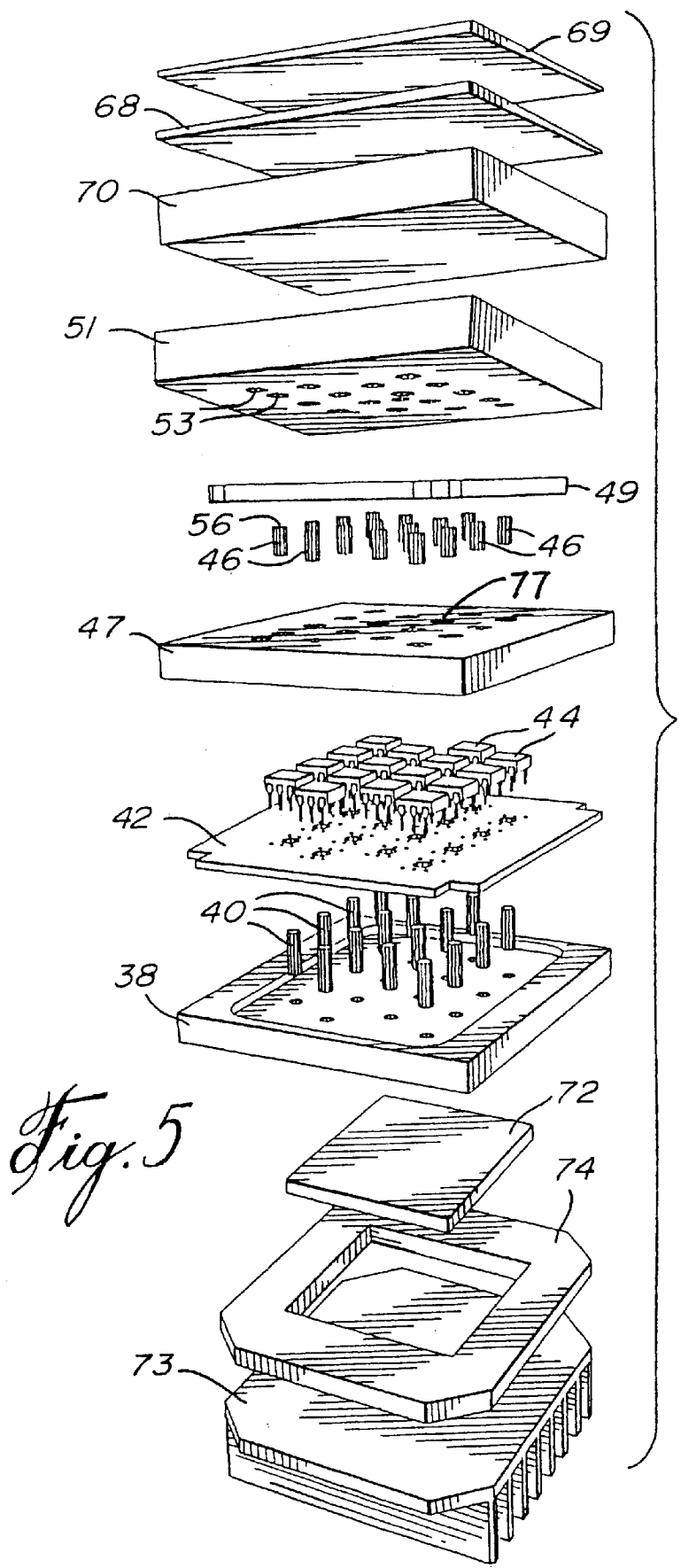
FIG. 5 is a complete exploded view of an alternate example of the X-ray imaging apparatus according to the second embodiment as shown in FIG. 3.

Referring now to FIG. 1, there is shown a first example of the imaging apparatus according to this invention as generally designated by numeral 10, which example concerns an application for converting an optical image of an object 12 into a digital representation. Such apparatus can be integrated, for example, in an aerial photography system, in replacement of conventional film cartridge, for further electronic image displaying or processing. The apparatus comprises an image capture assembly 14 having a casing 16 on which is mounted a prefocusing element 18. The prefocusing element 18 collects lights reflected by or emitted from the object 12 to form an optical image in a first plane lying at the output end 19 of the prefocusing element and to project this optical image through a first portion 20 of an image capture cartridge 22. The apparatus is further provided by a controlled shutter 24, which opens and closes the cartridge first portion 20 to light emitted from the optical image, whereby said exposure time can be controlled. An output 25 of the cartridge is connected to an input 26 of a controller interface 28 having an output 30 connected to an input 32 of a computer controller 34 through a link bus 27, by which analog image pixel signals produced at the output 25 of the cartridge 22 is digitally converted by the controller interface 28 and transferred to the computer controller 34 through the input 32 and link bus 31. The link buses 31 and 27 also provide connection respectively between the computer controller 24 and the controller interface 28, and between the controller interface 28 and the cartridge 22 for sending control signals thereto. The computer controller 34 also carry out image digital pixel signals processing to produce a digital representation of the object 12, which can be displayed on display monitor 36. The monitor 36 can also be used to display information to the operator.

Referring now to FIG. 2, the main functional elements of the cartridge 22 as shown in FIG. 1 are shown in an exploded view. The cartridge 22 comprises a cooling rods holder 38 provided with an array of cooling rods 40 protruding therefrom. An electronic circuit board 42, on which are mounted an array of optical sensors arrays 44, is mounted over cooling rods holder 38, whereby each one of the cooling rods 40 contacts a respective optical sensors array 44 for cooling thereof to a predetermined constant temperature. It is pointed out that other types of readily available optical sensors arrays, such as charge integrated device (CID), can be used with proper hardware and software adapted for CID reading. Instead of providing the imaging apparatus with a controlled shutter as described with reference to FIG. 1, CCD sensors arrays for which starting and stopping of light integration can be controlled for selecting exposure time can be chosen. An array of focusing elements 46 are mounted over the board 42, whereby each one of the optical sensor arrays are centrally covered by a respective one of the focusing elements 46. In an example as shown in FIG. 2, the focusing elements 46 are gradient index lenses currently available on the marketplace. Gradient index lenses were chosen as focusing elements for their good optical characteristics and compact dimensions. As well known in the art, each focusing element may be provided with a correction lens (not shown) so as to eliminate optical aberration that may occurs. A separating plate 48 is provided in the first portion of cartridge 22, which is mounted over the board 42, to cover the focusing elements 46 through bores 50. The separation plate 48 is further provided with a plurality of collimator cavities 52, each of these being centrally disposed over a respective bore 50, and being in communication therewith. The collimator cavities 52 provide the required field of view distance between the optical image plane of the pre-focusing element 18 as shown in FIG. 1 and an input end 56 on each of the focusing elements 46. Each one of the focusing elements 46 can be either directly stuck to the upper surface of a respective optical sensors array by means of a proper adhesive, or directly mounted thereon by means of a packing of adhesive inserted in the space delimited by the external surface of a focusing element 46 engaged in a corresponding bore 50, and by the internal surface of the same bore 50. As will be explained later in more detail, light emitted from an area of the optical image of the object 12 is focused by a corresponding focusing element 46 onto an associated optical sensors array 44, which integrates focused light during an exposure time set by the operator on the computer controller 34 controlling shutter 24, to produce a group of analog pixel signals representing a partial image associated with the corresponding area of the initial optical image. Groups of analog pixel signals produced by all sensors arrays 44 are then digitally converted by the controller interface 28, and produced digital pixel signals are fed to computer controller 34 which convert these digital pixel signals into composite digital pixel signals associated with respective points of a composite digital representation of the optical image, as will be later explained in more detail.

Referring now to FIG. 3, there is shown a second embodiment of the apparatus according to the present invention used as an X-ray imaging system as generally designated at numeral 57. An X-ray source 58 is provided for delivering a beam of X-ray radiation 60 toward an object 62 to be radiographed in order to obtain an image of the internal structure thereof. This object 62 can also be a part of a subject's body to be radiographed in order to obtain an image of the internal tissues thereof for diagnostic purposes. X-rays traversing the object of subject's body part 62 further pass through an optional bucky screen 64 for eliminating scattered X-rays produced during interaction with the object or of subject's body part 62. The apparatus further comprises a fluorescent screen cartridge 66 to receive filtered X-ray radiation traversing the bucky screen 64 through a first portion 65 of the cartridge 66. The general structure and operation of the fluorescent cartridge 66 will be explained later with references to FIGS. 4 and 5. The apparatus further comprises a controller interface 34, which are connected and operate the same way as previously explained with reference to the apparatus shown in FIG. 1.

Referring now to FIG. 4, the main functional elements of the cartridge 66 as shown in FIG. 3 are shown in an exploded view. As in the apparatus as shown in FIG. 2, the cartridge 66 comprises a cooling rods holder 38 provided with an array of cooling rods 40 protruding therefrom. An electronic circuit board 42, on which are mounted an array of optical sensors arrays 44, is mounted over the cooling rods holder 38, whereby each one of the cooling rods 40 contacts a respective optical sensors array 44, whereby heat generated therefrom are collected by the cooling rods 40 and the holder 38, thus keeping sensors arrays temperature at a normal predetermined level. An array of focusing elements 46 are mounted over the board 42, whereby each one of the optical sensor arrays are centrally covered by a respective one of focusing elements 46, which are gradient index lenses. A separating plate 48 is provided in the first portion of cartridge 66, which is mounted over the board 42, to cover focusing elements 46 through bores 50. The separation plate 48 is further provided with a plurality of collimator cavities 52, each of these being centrally disposed over a respective bore 50, and being in communication therewith. Each one of the focusing elements 46 can be either directly stuck to the upper surface of a respective optical sensors array by means of a proper adhesive, or directly mounted thereon by means of a packing of adhesive inserted in the space delimited by the external surface of a focusing element 46 engaged in a corresponding bore 50, and by the internal surface of the same bore 50. The cartridge 66 is further provided with a fluorescent screen 68 for receiving filtered X-rays entering the cartridge 66 through a protection screen 69 provided in the first portion 65 of the cartridge 66, as shown in FIG. 3. The protection screen can be made of any well known material transparent to X-rays and opaque to visible light, whereby ambient light cannot enter into the cartridge 66 while protecting the fluorescent screen form external impacts. As well known in the art, the fluorescent screen is activated by incoming X-rays so as to produce light whose wavelength range is substantially in the optical range, thereby producing an optical image on a plane thereof of the internal structure of the object or subject's body 62. The fluorescent screen 68 is superposed on a leaded glass screen 70 to block residual X-rays so as to prevent infiltration thereof toward focusing elements 50. The cavities 52 provide required field of view distance between the optical image plane of the fluorescent screen 68 and an input end 56 on each of the focusing elements 46. As shown in FIGS. 3 and 4, light emitted from an area of the optical image of the object or subject's body part 62 is focused by a corresponding focusing element 46 onto an associated optical sensors array 44, which integrates focused light during an exposure time set by the operator on the computer controller 34, which control X-ray source 58, to produce a group of analog pixel signals representing a partial image associated with the corresponding area of the initial optical image. Groups of analog pixel signals produced by all sensors arrays 44 are then digitally converted by controller interface 28, and produced digital pixel signals are fed to the computer controller 34 which convert these digital pixel signals into composite digital pixel signals associated with respective points of a composite digital representation of the optical image, as will be later explained in more detail.

Referring now to FIG. 5, there is shown a complete exploded view of an alternate example of the X-ray imaging apparatus as shown in FIG. 3. A cartridge heat sink 71 supports a cooling unit 72, such as a Peltier effect cooling unit, which is mounted in a frame 74 made of a proper heat and air insulation material such as foam. The frame 74 is directly mounted under a cooling rod holder 38 bearing cooling rods 40 so as the optical sensors arrays are cooled to a predetermined constant temperature through the cooling unit 72. An optical sensors aligment plate 47 preferably made of heat and electrical insulating material is mounted over the board 42 and receives upper surface of optical sensors arrays 44 through accurately positioned recesses (not shown) provided in the lower surface of the alignment plate 47, so as to provide precise aligment between the optical sensors arrays 44 and corresponding focusing elements 46. Perforations 77 extending through the alignment plate 47 and communicating with corresponding recesses of alignment plate 47 provide engagement therethrough for the focusing elements 46, so as to be directly aligned with the optical sensors arrays 44. A focusing elements holder 49 provided with proper perforations (not shown) is mounted over the focusing elements 46 and the alignment plate 47. A collimator plate 51 having collimator cavities 53 is mounted over the focusing elements holder 49, the cavities 53 providing required field of view distance between the optical image plane and an input end 56 on each of the focusing elements 46. The cartridge 66 is further provided with a fluorescent screen 68 for receiving filtered X-rays entering the cartridge 66 through a protection screen 69 provided in the first portion 65 of the cartridge 66, as shown in FIG. 3. The fluorescent screen 68 produces the optical image of the object or subjects body part under inspection, and accordingly defines the optical image plane. The fluorescent screen 68 is superposed on a leaded glass screen 70 to block residual X-rays so as to prevent infiltration thereof toward focusing elements 46. A casing (not shown) can be provided to mount the cartridge elements on a compact assembly, combined with a cover (not shown) having an exposure aperture therethrough.

Referring now to FIG. 6, there is shown a cross-sectional front view along line A-A' of FIG. 4 of a portion of a cartridge as provided in the apparatus of the present invention. There is shown two adjacent focusing-sensing subassemblies generally designated at numerals 83 and 83', which respectively comprises focusing elements 84 and 84' mounted on optical sensors arrays 86 and 86'. It can be seen from FIG. 6 that the adjacent focusing elements 84 and 84' have respective fields of vision 85 and 85' respectively intersecting areas 87 and 87' of the optical image of the object or subject's body part formed in a plane merging with the plane of fluorescent screen 68. It can further be seen that fields of vision of adjacent focusing elements 84 and 84' intersect common portion 89 of said optical image, whereby substantially the entirety of the optical image of the object or subject's body part is covered by the combined fields of vision of the focusing elements 84 and 84', as will be better shown with reference to FIG. 7. In a particular case as shown in FIG. 8A, centers of sixteen focusing elements form a hexagonal lattice, which centers respectively coinciding with centers of optical image areas 88 respectively covered by the field of view of focusing elements and optical sensor arrays 90 aligned therewith, as later explained in more detail with reference to FIG. 7. It is pointed out that common portions between field of view of adjacent focusing elements intersecting the optical image plane as shown in FIGS. 6 and 7, have been removed in FIG. 8 to better show how the whole optical image of the object are covered by combined fields of view of all focusing elements.

The optical image plane as shown in FIG. 8A is segmented in a group of image areas, which group comprises a series of adjacent rows of areas, respectively designated at numerals 75,75,83 and 83, which areas being respectively aligned with centers 109 of the focusing elements (not shown) and the associated optical sensors arrays 90. A can be shown in FIG. 8A, these centers form a hexagonal lattice according to a preferred embodiement of the present invention. A spacing S is provided between any adjacent centers 109 of areas comprised in rows 75,75,83 or 83, which spacing S is equal to ½ R, wherein R is a common diameter of an area 82 bounding the perimeter of each optical image area 88. A spacing S' between rows of areas 75,75,83 and 83, as illustrated for rows 75 and 75 which extend respectively along axis A-A' and B—B as shown in FIG. 8A, this spacing S' being equal to $\sqrt{3}R$. It is pointed out that an array comprising more than sixteen optical sensors arrays can be realized according to the principle as herein described. It is also pointed out that other geometrical distributions of optical sensors arrays could be proposed, such as a square distribution, provided spacing between adjacent focusing elements is chosen in a such a manner than fields of vision of adjacent focusing elements 84 and 84 intersect common portion 89 of said optical image, as shown in FIG. 6, whereby substantially the entirety of the optical image of the object or subject's body part is covered by the combined fields of vision of the focusing elements 84 and 84'.

Referring now to FIG. 7, there are shown four adjacent focusing elements respectively designated at numerals 91, 92, 93, and 94, with associated optical sensors arrays 95, 96, 97, and 98, and corresponding areas 99, 100, 101, and 102 of an object image 103, represented as a capital letter R in a particular instance as shown in FIG. 7. As previously stated with reference to FIG. 6, it can be seen from FIG. 7 that the areas 99, 100, 101, and 102 are intersected by respective fields of view of the focusing elements 91, 92, 93, and 94, whereby substantially the entirety of the optical image of the object 103 is covered by combined fields of vision of the focusing elements 91, 92, 93, and 94. Each of the optical sensors arrays 95, 96, 97 and 98 is optically associated with a respective one of the focusing elements 91, 92, 93, and 94. At least a portion of light emitted from an area of the optical image corresponding with one of the focusing elements 91, 92, 93 and 94 and traversing therethrough is focused onto an associated one of the optical sensors arrays 95, 96, 97, and 98, so as to ensure that light emitted from substantially each point of the optical image is focused on at least one optical sensor provided on one of optical sensors arrays 95, 96, 97, and 98. Therefore, there is substantially no point in optical image 103 that has not a corresponding focused point on one of the focused partial images 104, 105, 106, and 107 respectively projected onto optical sensors arrays 95, 96, 97 and 98. It can be seen that the focused partial images 104, 105, 106 and 107 are inverted compared to the corresponding areas 99, 100, 101, and 102. This inversion can be corrected by mounting optical sensors arrays in an inverted position on the board. Although whole partial images are projected on a sensing surface 108 of each of the optical sensors arrays 95, 96, 97 and 98 on a particular example as shown in FIG. 7, it is to be understood that only a portion of the partial images 104, 105, 106, and 107 can be projected on the surface 108 of respective sensors arrays 95, 96, 97 and 98, to the extent that light emitted from substantially each point of the optical image is still focused on at least one optical sensor provided on one of the optical sensors arrays 95, 96, 97, and 98. It is also pointed out in an example as shown in FIG. 7, that a given point comprised in a sub-area 110 could be associated to four focused points respectively comprised in the partial images 104, 105, 106, and 107, while another point comprised in a sub-area 112 could be associated to two focused points respectively comprised in the partial images 106, and 107. The general method used by the apparatus according to the present invention to reassemble these partial images for producing a complete composite digital image representation of the initial image of the object will be now explained with reference to FIG. 10A through FIG. 13 B.

Referring to FIG. 10A, there is shown a theoretical example of an optical image of an object generally designated at numeral 114, which presents four circular FIGS. 115, 116, 118 and 120 whose dimensions are in the range of the dimensions of a single optical sensor 123 as schematically shown in FIG. 12A and as hereunder discussed. Turning now to FIG. 10B, there is shown a segmentation of the optical image as illustrated in FIG. 10A, in four partial images 122, 124, 126 and 128 according to overlapping fields of view of corresponding adjacent focusing elements (not shown). Referring now to FIGS. 11A through 11D, these figures represent focused images 130, 132, 134, 136 as produced by the proposed method, which correspond respectively to the partial images 122, 124, 126 and 128 as shown in FIG. 10B. Turning now to FIGS. 12A through 12D, there is shown the result of a digitalization of focused partial images corresponding with the partial images as shown in FIG. 11A to 11B, which FIGS. further show the position of digitized focused images with reference to respective optical sensors arrays 138, 140, 142 and 144. Thus, optical sensors producing pixel signals corresponding to the circular FIGS. 114, 116, 118 and 120 are designated in FIGS. 12A trough 12D at numerals 146, 148,150 and 152. It can be seen that although it would be preferable to have a two-dimensional array of focusing elements arranged in such a way that corresponding field of views of adjacent focusing elements would form a geometrically regular pattern, the proposed method can be carried out even when adjacent field of view are not disposed according to a geometrically regular pattern, as in the example shown in FIG. 10B, as hereunder explained with reference to FIG. 13A, which shows the result of a digital reassembling of the digitized focused partial images 138, 140, 142 and 144. In order to carry out such a rearrangement, while the condition requiring that substantially each point of the original image 114 is associated with at least one optical sensors should still be respected, the proposed method further uses a spatial relationship between exposed optical sensors comprised in corresponding optical sensors arrays and corresponding points of a composite digital representation of the complete optical image 114, as shown in FIG. 13B, to reassemble the digitized focused partial images and for producing a final reconstituted image 154 of the optical image 114 as shown in FIG. 13B, which is a composite digital representation of this initial optical image.

Figure 14A:
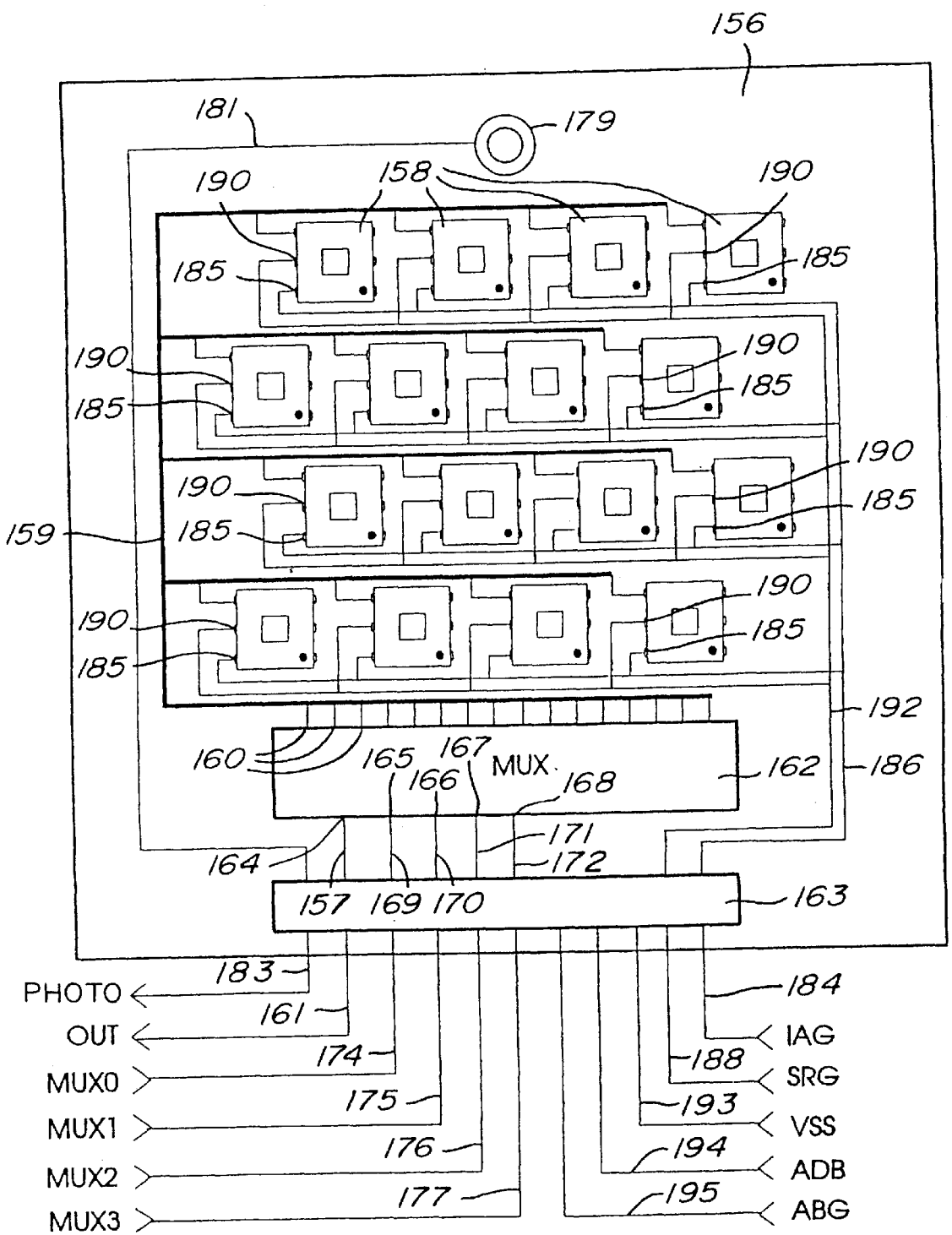
FIG. 14A is a block diagram of a cartridge electronic circuit provided in an apparatus according to the present invention.

Referring now to FIG. 14A, there is shown a block diagram of an example of a cartridge electronic circuit provided in an apparatus according to the present invention. On a printed circuit board 156 are mounted an array of sixteen optical sensors arrays 158. Each optical sensors array 158 has a respective output connected through a bus line 159 to a respective one of analog pixel signal inputs 160 provided on a multiplexer 162. The multiplexer 162 is further provided with an output transmitting through a line 157, a connector 163 and a line 161 analog pixel signals toward the controller interface of the apparatus as will be explained with reference to FIG. 14B. Four control inputs 165, 166, 167 and 168 are provided on the multiplexer 162 for receiving trough connector output lines 169, 170, 171, and 172 multiplexer binary control signals MUX0, MUX1, MUX2, and MUX3, which are fed to the connector 163 respectively through lines 174, 175, 176 and 177. The number of multiplexer control signals required depends on the number of optical sensor arrays provided in the cartridge. For an example as shown in FIG. 14A, four control signals provides the required sixteen control signals combinations ($2^4$), so as to sequentially control the sending of analog pixel signal produced by respective optical sensors array toward the controller interface. A photocell 179 is mounted on the board 156 for sending an exposure indicating signal to the controller interface through a line 181, the connector 163 and a line 183, whenever light is emitted from the fluorescent screen during an exposure time. A soon as an exposure is ended, the photocell interrupts the sending of the exposure indicating signal. In a particular example of the apparatus according to the present invention as shown in FIG. 1, such a photodiode is not required since the computer controller controls the exposure time by activation of a shutter. A line 184 feeds to the connector 163 an image area gate signal (IAG) which is transmitted to an input 185 provided on each optical sensors array 158 through a line bus 186. The image area gate signal control the transfer of charges integrated in a row of optical sensors of an array 158 to a serial register provided therein (not shown). A line 188 feeds to the connector 163 a serial register gate signal (SRG) which is transmitted to an input 190 provided on each optical sensors array 158 through a line bus 192. A ground (VSS) is provided to the connector 163 through a line 193. An amplifier drain bias signal is provided to the connector 163 through a line 194. Finally, an anti-blooming gate signal (ABG)is provided to the connector 163 through a line 195.

Figure 14B:
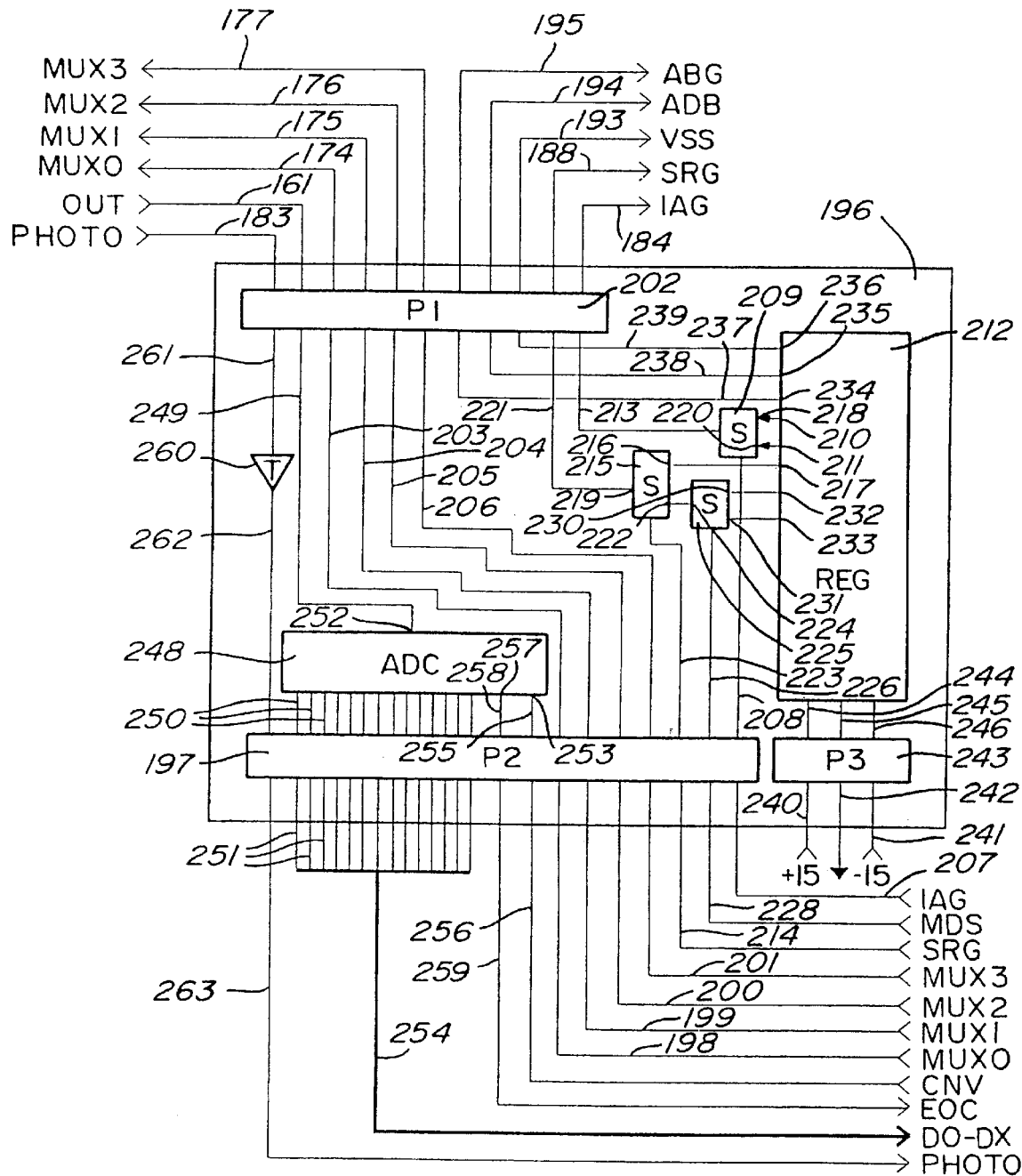
FIG. 14B is a block diagram of the controller interface circuit provided in an apparatus according to the present invention.

Referring now to FIG. 14B, there is shown a block diagram of an example of a controller interface circuit provided in an apparatus according to the present invention. A printed circuit board 196 is provided for mounting controller elements. Multiplexer binary control signals MUX0, MUX1, MUX2, and MUX3 as produced by the computer controller (not shown) are fed to a main connector 197 respectively through lines 198, 199, 200 and 201, and then transmitted to an output connector 202 through lines 203, 204, 205 and 206, for finally be directed toward the cartridge circuit as shown in FIG. 14A through connector output lines 174, 175, 176 and 177. The computer controller sends the image area gate signal (IAG) to the main connector 197 through a line 207, and this signal is transmitted through a line 208 to a first switcher 209, which have first and second inputs 218 and 220 being connected to first high and low control outputs 210 and 211 of an optical sensors arrays regulating and controlling circuit 212. The IAG signal having a proper level is then directed to the connector 202 through a line 213, for finally be directed toward the cartridge circuit through the line 184. The computer controller sends the serial register gate signal (SRG) to the main connector 197 through a line 214, and this signal is transmitted through a line 223 to a second switcher 215 having a first input 216 connected to a second high control output 217 of the optical sensors arrays regulating and controlling circuit 212, and having an output 219 connected to the connector 202 through a line 221. The resulting SRG signal is then sent to the cartridge circuit through the connector 202 and the line 188. A SRG clock signal causes the serial registers to shift the stored analog pixel signals one column left toward an output amplifier provided on reading areas (not shown) from which they can be transmitted to the multiplexer 162. The second switcher 220 has a second input 222 connected to an output 224 of a third switcher 225, which receives through a line 226, the main connector 197, and a line 228 a mid-level SRG select signal (MDS) produced by the computer controller. The third switcher 225 is provided with first and second inputs 230 and 231 which are respectively connected to second high and low control outputs 232 and 233 provided on the optical sensors arrays regulating and controlling circuit 212. When the computer controller sends a high level SRG signal to the switcher 215, the resulting SRG signal fed to the cartridge circuit through the connector 202 and the line 221 has a high level. When the computer controller sends a low level SRG signal to the switcher 215, the resulting SRG signal fed to the cartridge circuit will have a mid level when the computer controller sends a high level MDS signal to the third switcher 225, and will have a low level when the computer controller sends a low level MDS signal to the third switcher 225. When a resulting SRG signal having a mid level is received by optical sensors arrays integrated amplifiers (not shown) through the line bus 192 as shown in FIG. 14A, these amplifiers are switched to a low noise reference reading mode. This feature will be later discussed in more detail in a following description of the apparatus operation, with reference to FIG. 16H. The optical sensors arrays regulating and controlling circuit 212 produces control signals ADB and ABG and ground VSS at outputs 234, 235 and 236, which are fed to the connector 202 through lines 237, 238 and 239, to be then directed to the cartridge circuit respectively through the lines 195, 194 and 193. The optical sensors arrays regulating and controlling circuit 212 is connected to a power supply unit (not shown) through power lines 240 and 241 and a ground line 242, a power supply connector 243 and lines 244, 245 and 246. Analog pixel signals coming from cartridge circuit through the line 161 are transmitted to a first input 252 of an analog to digital converter (ADC) 248, through the connector 202 and a line 249. The analog to digital converter 248 is provided with a plurality of outputs 250, the number of which depends on byte length of the resulting digital pixel signals as required. Digital pixel signals so produced are directed to the computer controller through the connector 197 and through a plurality of lines 251 merging to a main line bus 254. The analog to digital converter 248 is further provided with a second input 253 receiving a conversion control signal (CNV) transmitted thereto by the computer controller through a line 255, the connector 197 and a line 256. An end of conversion signal is sent toward the computer controller at an output 257 of the analog to digital converter 248 through a line 258, the connector 197 and a line 259. The exposure indicating signal produced by the photocell 179 as shown in FIG. 14A, is sent by the cartridge circuit to a threshold adjusting amplifier 260 through a line 183, the connector 202 and a line 261. The resulting signal is directed to the computer controller through a line 262, the connector 197 and a line 263.

Figure 8B:
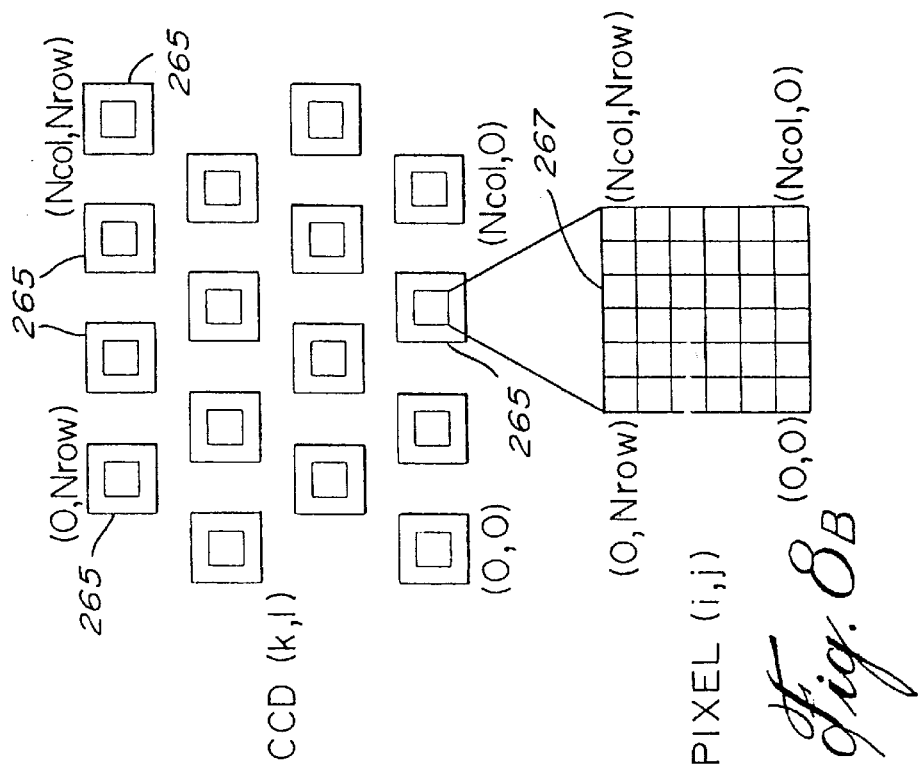
FIG. 8B is a schematic view of optical sensors arrays provided on the preferred embodiment of the present invention as referred to in FIG. 8A, showing spatial coordinates of optical sensors arrays and optical sensors thereof.
Figure 8A:
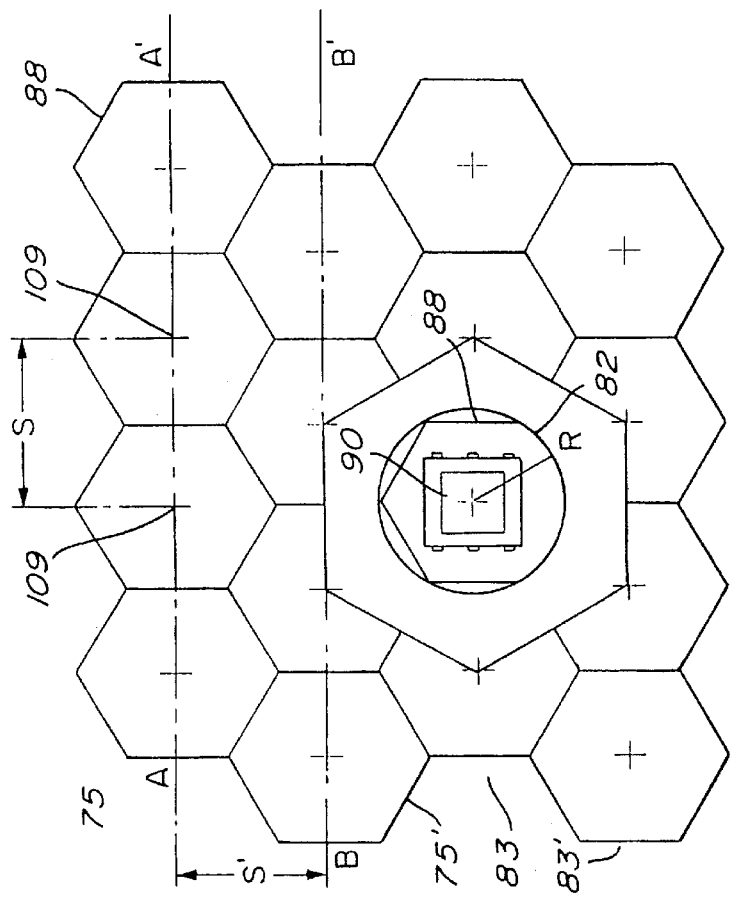
FIG. 8A is a plan schematic view over the optical image plane showing a segmentation of the optical image plane in a group of image areas, which are in alignment with centers of the focusing elements and associated optical sensors arrays forming a hexagonal lattice according to a preferred embodiment of the present invention.

Referring now to FIG. 8B, there is schematically shown the spatial coordinates (k,l) of optical sensors arrays 265 and the spatial coordinates (i,j) of optical sensors 267 provided in the arrays 265. For the sake of simplicity of notation, and according to a well known convention, optical sensors arrays will be hereunder designated as CCD, and optical sensors will be hereunder designated as pixels. According to the proposed method, the initial objects optical image I coresponds to a number $N_{ccd}$ of partial images $I^{k,l}$ associated with a corresponding number of focusing elements. Furthermore, each partial image $I^{k,l}$ comprises a number $N_{pixel}$ pixels $$I_{i,j}^{k,l}$$

which can be represented by the following relation:

$$I = \{I^{k,l}\} \Leftrightarrow I^{k,l} = \{I_{i,j}^{k,l}\} \qquad (1)$$

As shown in FIG. 8B at numeral 268, the intensity of a pixel (i,j) of a column i, row j of a CCD(k,l) of a column k, row l, is represented by:

$$I_{i,j}^{k,l} \begin{array}{l} \to ccd \\ \to pixel \end{array} \qquad (2)$$

Others coordinates parameters can be defined as follows:

$$N_{pixel} = N_{pixel}^{col} \times N_{pixel}^{row} \qquad (2.1)$$
$$0 \le i < N_{pixel}^{col}$$
$$0 \le j < N_{pixel}^{row}$$

wherein $$N_{pixel}^{col}$$

is the number of pixels columns per CCD and $$N_{pixel}^{row}$$

is the number of pixels rows per CCD; and:

$$N_{ccd} = N_{ccd}^{col} \times N_{ccd}^{row} \qquad (2.2)$$
$$0 \le k < N_{ccd}^{col}$$
$$0 \le l < N_{ccd}^{row}$$

Wherein $$N_{ccd}^{col}$$

is the number of CCD columns in the array of CCDs and $$N_{ccd}^{row}$$

is the number of CCD rows in the array.

Figure 9B:
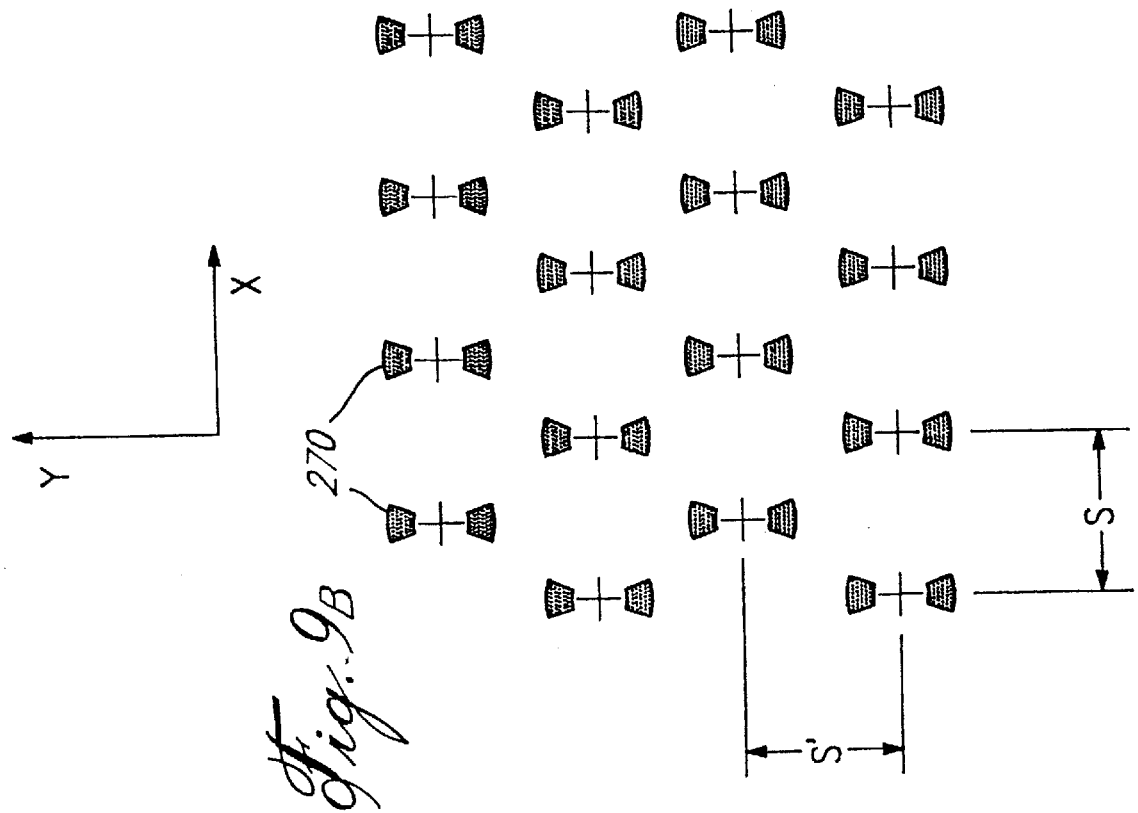
FIG. 9B is a partial view of a first example of calibration pattern using a plurality of calibration figures as shown in FIG. 9A.
Figure 9A:
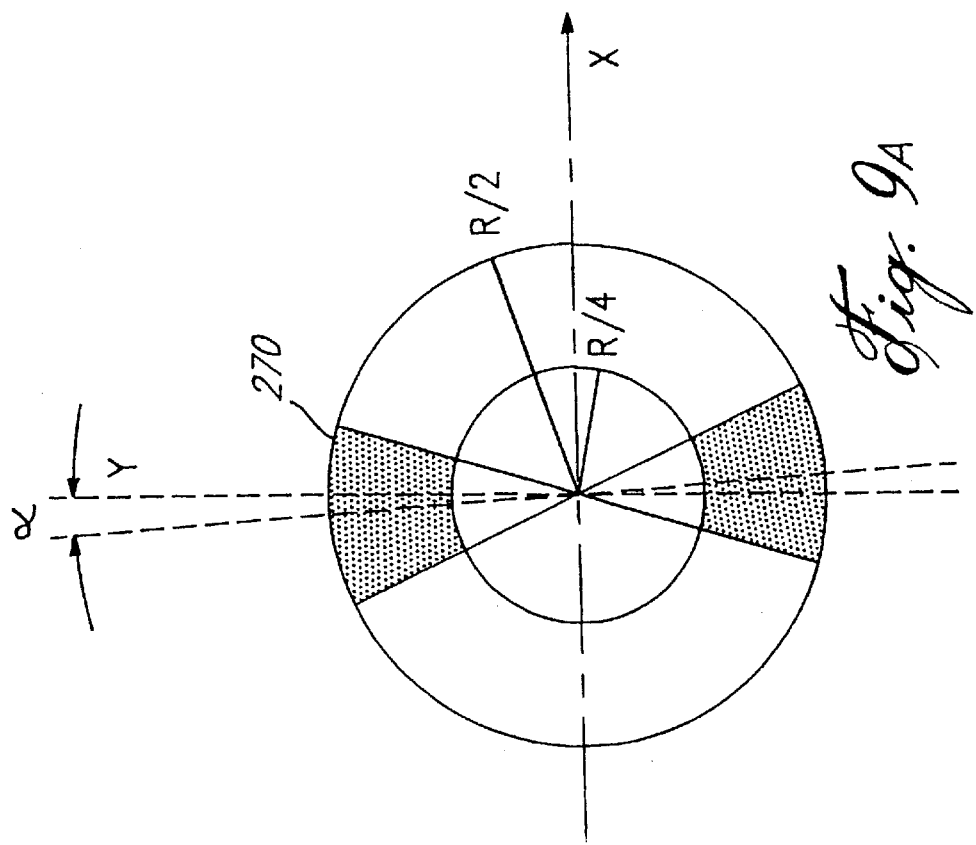
FIG. 9A is a first example of a calibration figure which could be used for the calibration of an apparatus according to the present invention.

Referring now to FIG. 9A, there is shown a first example of a calibration dipolar FIG. 270 which could be used for the spatial calibration of the CCD arrays and pixels according to the present invention, whose proposed dimensions are expressed as ratios of image area diameter. Turning now to FIG. 9B, there is shown a hexagonal arrangement of a plurality of figures as shown in FIG. 9A, which forms a calibration pattern used as a mask, as hereunder explained in more detail, wherein each figure is aligned with the center of a respective CCD array according to spacings S and S' as earlier explained with reference to FIG. 8A.

Figure 15A:
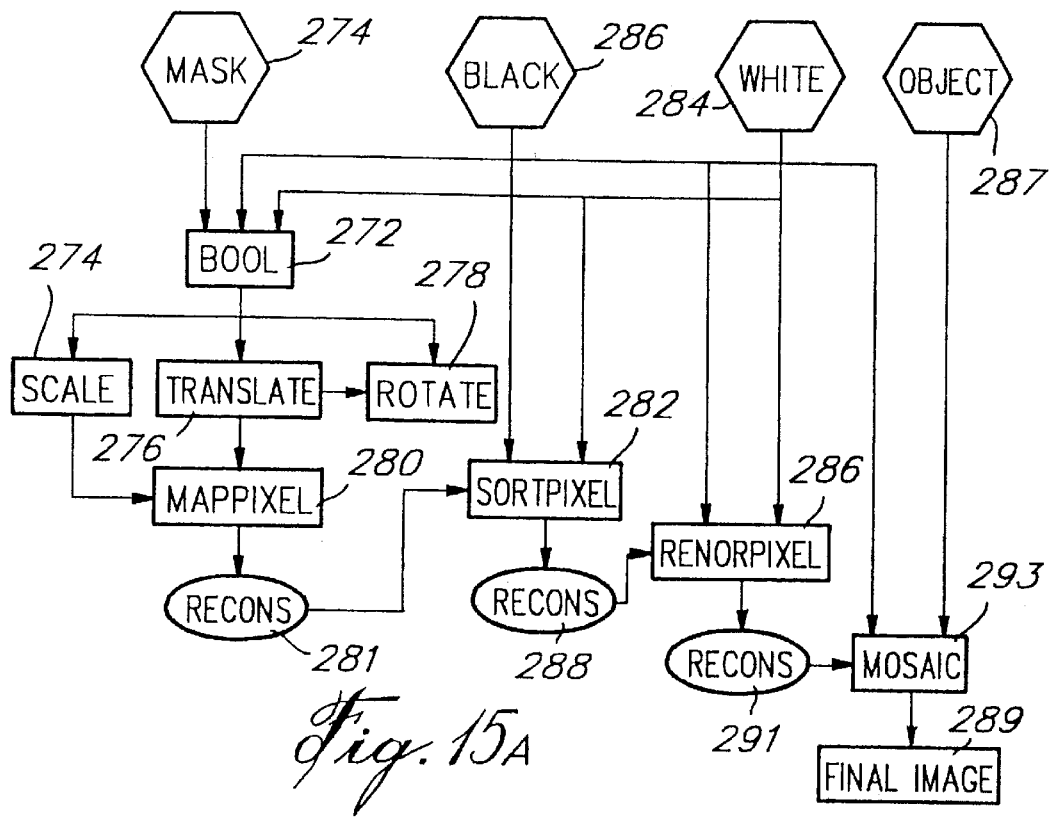
FIG. 15A is a process flow diagram of a first example for the calibration of the apparatus according to the of the present invention, which uses the calibration figure and pattern as shown in FIGS. 9A and 9B.

Referring now to FIG. 15A, there is shown a process flow diagram of an example of a spatial calibration as proposed by the present invention. In a first step 272, a BOOL operation normalizes each partial image $M^{k,l}$ of a calibration mask 274 characterized by the pattern as shown in FIG. 9B, using a wide image W 284 and a clock image B 286 produced under specific conditions as later described, so as to produce partial binary images $m^{k,l}$ for each partial image $M^{k,l}$ of the calibration mask 274. A SCALE step 274 provides a mean optical magnification factor $H^{k,l}$ and absolute translation parameters $$X_a^{k,l} \text{ and } Y_a^{k,l}$$

for each partial image $M^{k,l}$ of calibration mask 274. More specifically, the optical magnification $H^{k,l}$ of a CCD(k,l) array is proportional to the square root of the ratio of the area of the partial image upon the area of the calibration figure as an object, according to the following relation:

$$H^{k,l} = \sqrt{\frac{A_{image}^{k,l}}{A_{object}}} \quad (3)$$

In the particular case of a calibration figure as shown in FIG. 9A $A_{object}$ and $$A_{image}^{k,l}$$

are given by:

$$A_{object} = \frac{3\sqrt{3}}{16} R^2 \quad (4)$$

and by:

$$A_{image}^{k,l} = N_A^{k,l} h_x h_y \quad (5)$$

wherein $$N_A^{k,l}$$

represents the number of white pixels of the image, $h_x$ and $h_y$ are respectively physical dimensions of said optical sensors along X and Y axis of a cartesian coordinates system and the product $h_x h_y$ represents the area of a pixel.

By defining an intensity threshold $S^{k,l}$ for each partial image $M^{k,l}$ of the calibration mask or pattern 274, $S^{k,l}$ being given a value of 0.5 in a preferred example, a binary image $m^{k,l}$ can be defined according to the following relations:

$$m_{i,j}^{k,l} = 1 \Rightarrow M_{i,j}^{k,l} > S^{k,l} \quad (6)$$

$$m_{i,j}^{k,l} = 0 \Rightarrow M_{i,j}^{k,l} < S^{k,l} \quad (7)$$

so that for a given CCD(k,l) array we have:

$$N_A^{k,l} = \sum_{i,j} m_{i,j}^{k,l} \quad (8)$$

Using a mean $N_A$ for all $N_A^{k,l}$ for all CCD arrays we obtain:

$$N_A = \frac{1}{N_{ccd}} \sum_{k,l} N_A^{k,l} \quad (9)$$

We obtain absolute translation parameters according to X and Y axes by:

$$\Lambda_x = \frac{\lambda_x}{h_x} \times \sqrt{\frac{16 N_A h_x h_y}{3\sqrt{3} R^2}} = \sqrt{\frac{16 N_A}{\sqrt{3} \beta}} \quad (10)$$

and:

$$\Lambda_y = \frac{\lambda_y}{h_y} \times \sqrt{\frac{16 N_A h_x h_y}{3\sqrt{3} R^2}} = \sqrt{\frac{12 N_A \beta}{\sqrt{3}}} \quad (11)$$

wherein:

$\lambda_x$ is the figures spacing on the calibration mask 274 along the X axis;

$\lambda_y$ is the figures spacing on the calibration mask 274 along Y axis;

R is the diameter of an image area covered by a corresponding focusing element;

$\beta$ is a pixel ratio given by:

$$\beta = \frac{h_x}{h_y} \quad (12)$$

Hence, for a given partial image $M^{k,l}$, the absolute translation of coordinates, for a hexagonal array of optical sensors arrays as shown in FIGS. 8a and 8B, are given by:

$$X_a^{k,l} = (k+1)\Lambda_x \rightarrow l \text{ even} \quad (13)$$

$$X_a^{k,l} = \left(k + \frac{3}{2}\right)\Lambda_y \rightarrow l \text{ odd} \quad (14)$$

and:

$$Y_a^{k,l} = (l+1)\Lambda_y \quad (15)$$

Returning now to FIG. 15A, a TRANSLATE step 276 is carry out for determining mass centers an relative translation parameters $$X_r^{k,l} \text{ and } Y_r^{k,l}$$

for each partial image $M^{k,l}$ of the calibration mask 274. In the particular case of a calibration figure as shown in FIG. 9A, these relative translation parameters are given by:

$$X_r^{k,l} = \frac{1}{N_A^{k,l}} \sum_{i,j} i m_{i,j}^{k,l} \quad (16)$$

and:

-continued $$Y_r^{k,l} = \frac{1}{N_A^{k,l}} \sum_{i,j} jm_{i,j}^{k,l} \quad (17)$$

Returning to FIG. 15A, a ROTATE step 278 is carry out for determining relative rotation angles for each partial image $M^{k,l}$ of the calibration mask 274. In the particular case of a calibration figure as shown in FIG. 9A, a mean rotation angle $\alpha$ can be derived by measuring an angle $\theta$ for each pixel(i,j,k,l) relative to Y axis with reference to the relative symmetry center represented by $$(X_r^{k,l}, Y_r^{k,l})$$

according to the following relations:

$$\theta_{i,j}^{k,l} = \arctan\left(\beta \frac{i - X_r^{k,l}}{j - Y_r^{k,l}}\right) \quad (18)$$

and:

$$\alpha^{k,l} = \frac{1}{N_A^{k,l}} \sum_{i,j} \theta_{i,j}^{k,l} m_{i,j}^{k,l} \quad (19)$$

Figure 9D:
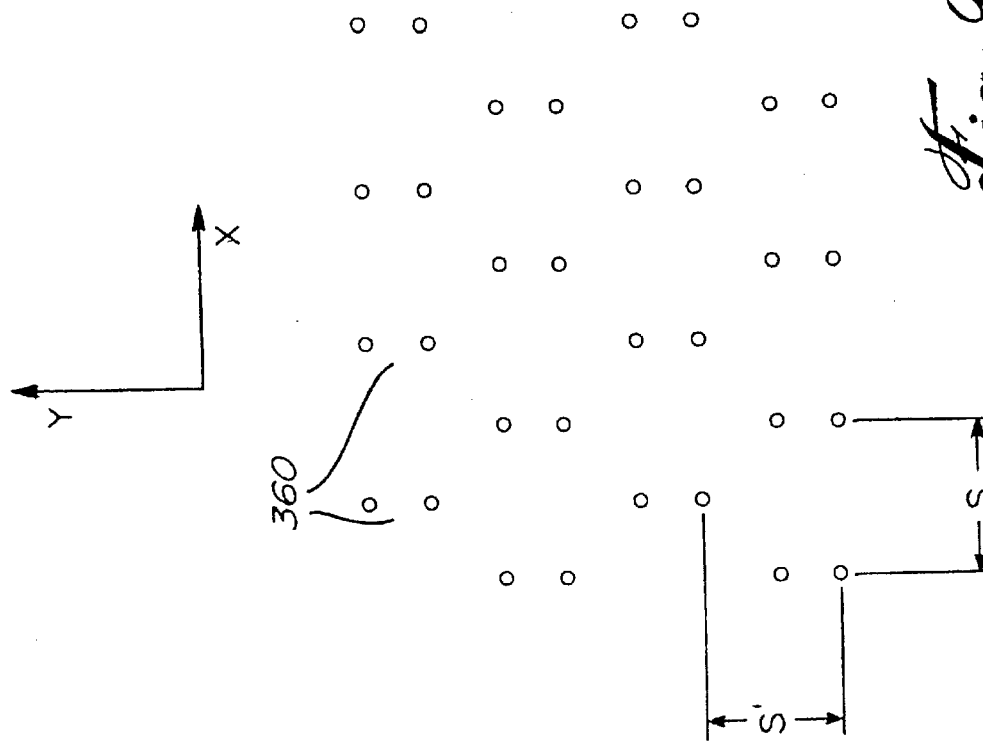
FIG. 9D is a partial view of a second example of calibration pattern using a plurality of calibration figures as shown in FIG. 9C.
Figure 9C:
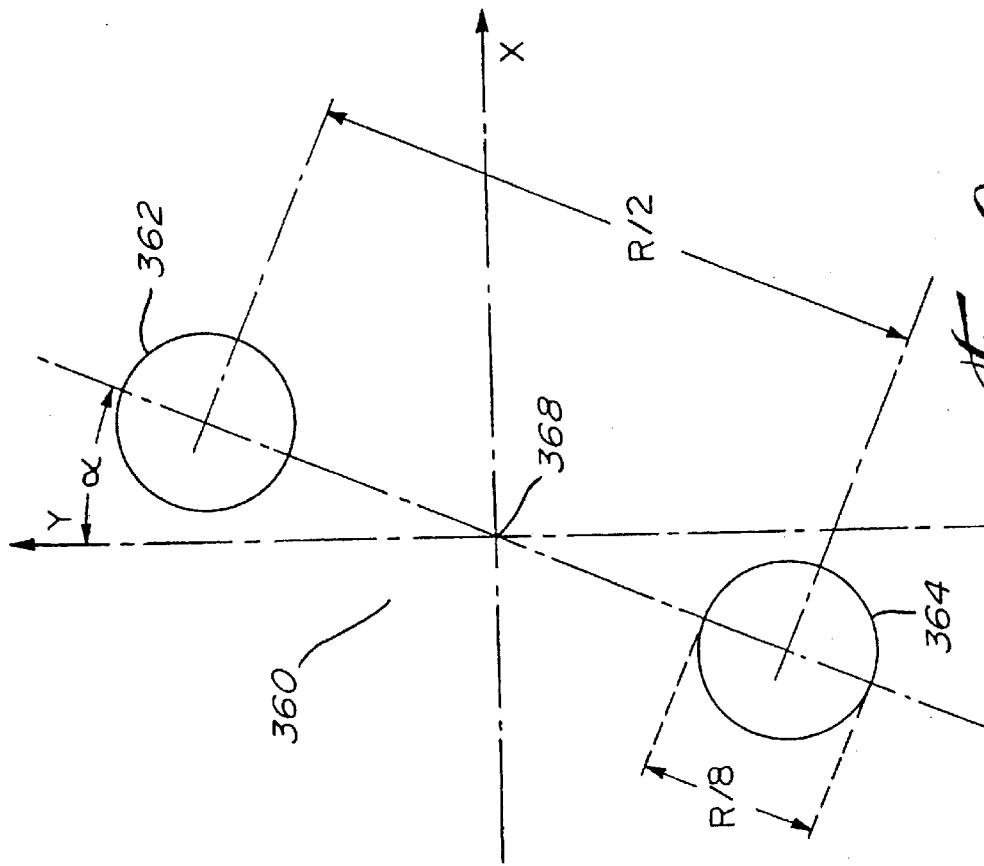
FIG. 9C is a second example of a calibration figure which could be used for the calibration of an apparatus according to the present invention.

Turning now to FIGS. 9C and 9D, an second example for the calibration of the apparatus according to the of the present invention will be hereunder desribed. Referring to FIG. 9C, there is shown a second example of a calibration dipolar FIG. 360 comprised of a pair of dark circles 362 and 364, which could be also used for the spatial calibration of the CCD arrays and pixels, and whose proposed dimensions are expressed as ratios of image area diameter R. Turning now to FIG. 9D, there is shown a hexagonal arrangement of a plurality of figures as shown in FIG. 9C, which forms a second calibration pattern which can be used as a calibration mask, as hereunder explained in more detail, wherein each figure is aligned with the center of a respective CCD array according to spacings S and S as earlier explained with reference to FIG. 8A.

Figure 15B:
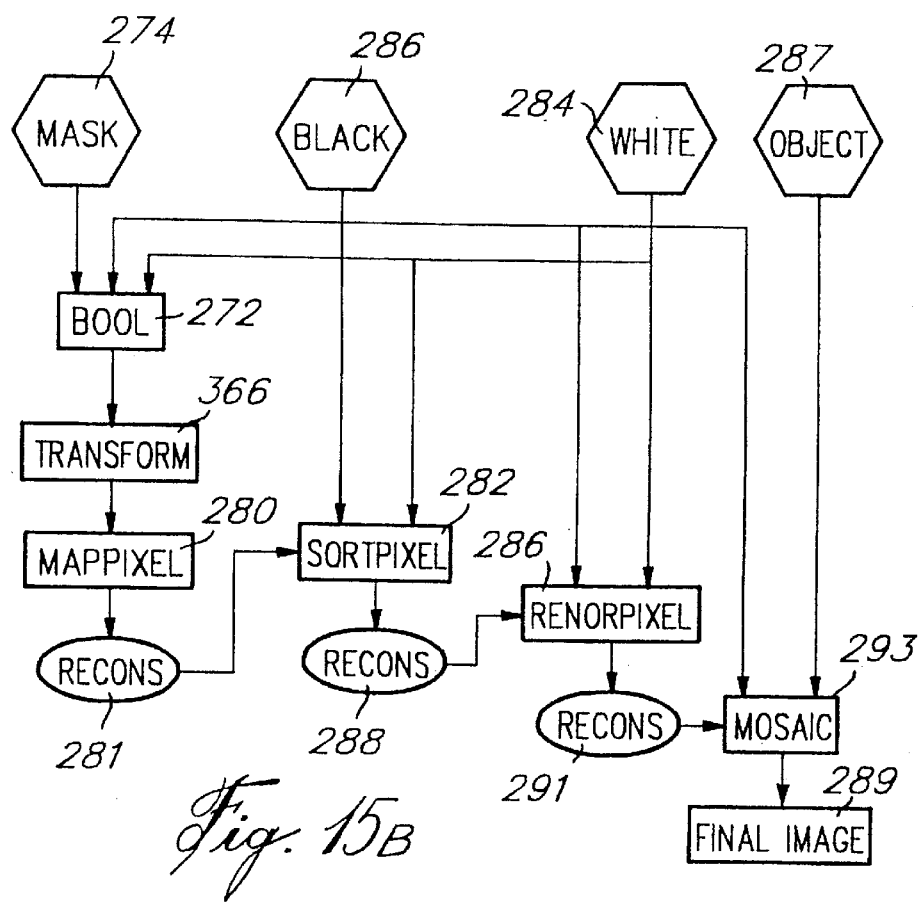
FIG. 15B is a process flow diagram of a second example for the calibration of the apparatus according to the of the present invention, which uses the calibration figure and pattern as shown in FIGS. 9C and 9D.

Referring now to FIG. 15B, there is shown a process flow diagram for the second example of spatial calibration, in which at a first step 272, a BOOL operation normalizes each partial image $M^{k,l}$ of a calibration mask 274 characterized by the calibration pattern as shown in FIG. 9D, using a white image W 284 and a black image B 286 produced under specific conditions as later described, so as to produce partial binary images $m^{k,l}$ for each partial image $M^{k,l}$ of the calibration mask 274. By defining an intensity threshold $S_{k,l}$ for each partial image $M^{k,l}$ of the calibration mask or pattern 274, $S^{k,l}$ being given a value of 0.5 in a preferred example the binary image $m^{k,l}$ can be defined according to the following relations:

$$m_{i,j}^{k,l} = 1 \Rightarrow M_{i,j}^{k,l} > S^{k,l} \quad (20)$$

$$m_{i,j}^{k,l} = 0 \Rightarrow M_{i,j}^{k,l} > S^{k,l} \quad (21)$$

Turning now to FIG. 9C, respective centers $$(x_A''^{k,l}, y_A''^{k,l}) \text{ and } (x_B''^{k,l}, y_B''^{k,l})$$

of circles 362 and 364 of the calibration FIG. 360 for each binary partial image $m^{k,l}$ are obtained in a closed form (non-iterative) through computation of respective mass centers for each calibration figure according to the following mathematical expressions:

$$(x_A''^{k,l}, y_A''^{k,l}) = \frac{1}{N_{up}^{k,l}} \left( \sum_{i,j} im_{i,j}^{k,l}, \sum_{i,j} jm_{i,j}^{k,l} \right)_{up} \quad (22)$$

$$(x_B''^{k,l}, y_B''^{k,l}) = \frac{1}{N_{down}^{k,l}} \left( \sum_{i,j} im_{i,j}^{k,l}, \sum_{i,j} jm_{i,j}^{k,l} \right)_{down} \quad (23)$$

$$N_{up}^{k,l} = \left( \sum_{i,j} m_{i,j}^{k,l} \right)_{up} \quad (24)$$

and $$N_{down}^{k,l} = \left( \sum_{i,j} m_{i,j}^{k,l} \right)_{down} \quad (25)$$

wherein $$N_{up}^{k,l}$$

this the number of white pixels on the upper portion of a binary image $m^{k,l}$, $$N_{down}^{k,l}$$

is the number of white pixels in the lower portion of a binary image $m^{k,l}$, summations in equations (23),(24) and (25) being carried out respectively in the upper half-image and lower half-image. It is pointed out that manufacturing tolerance on the cartridge would be small enough so as calibration circles 362 and 364 are completely enclosed respectively in upper and lower half-images, and so as in a given binary partial image $m^{k,l}$, none of calibration circles corresponding to adjacent binary partial images is present. Spacing $d''^{k,l}$ between circles 362 and 364 in the binary image $m^{k,l}$ in terms of "pixel x" unit equal to $h_x$, which is physical dimension of the optical sensors along X axis of a cartesian coordinates system, is given by:

$$d''^{k,l} = \sqrt{(x_B''^{k,l} - x_A''^{k,l})^2 + \frac{(y_B''^{k,l} - y_A''^{k,l})^2}{\beta^2}} \quad (26)$$

and $$\beta = \frac{h_x}{h_y} \quad (27)$$

wherein $\beta$ is the ratio of $h_x$ and $h_y$, which are physical dimensions of said optical sensors along X and Y axis of a cartesian coordinates system. Relative translation parameters $$X_r^{k,l} \text{ and } Y_r^{k,l}$$

which corresponds to a dipolar calibration figure center 368 in a binary partial image $m^{k,l}$ and coinciding with an area center 109 as shown in FIG. 8A, are obtained according to the following expression:

$$(X_r^{k,l}, Y_r^{k,l}) = \frac{1}{2}\left((x_A''^{k,l}, y_A''^{k,l}) + (x_B''^{k,l}, y_B''^{k,l})\right) \quad (28)$$

and the angle α of the calibration dipolar FIG. 360 with respect to Y axis as shown in FIG. 9C is given by:

$$\sin\alpha^{k,l} = \frac{(x_B''^{k,l} - x_A''^{k,l})}{d''^{k,l}} \quad (29)$$

and $$\cos\alpha^{k,l} = \frac{(y_B''^{k,l} - y_A''^{k,l})}{\beta d''^{k,l}} \quad (30)$$

The optical magnification $H^{k,l}$ for a partial image $m^{k,l}$ is given by:

$$H^{k,l} = \frac{d''^{k,l}}{D} \quad (31)$$

wherein D is the physical spacing between circles 362 and 364 of each calibration dipolar FIG. 360 comprised in the calibration mask represented at numeral 274 in FIG. 15B, which mask consisting of the pattern as shown in FIG. 9D. The resulting optical magnification H is obtained through averaging all $H^{k,l}$, its variation among all optical subassemblies being negligible. We obtain absolute translation parameters $\Lambda_x$ and $\Lambda_y$ according to X and Y axis, respectively in terms of $h_x$ and $h_y$ units and in terms of $\Lambda_x$ and $\Lambda_y$, which are respectively figures spacings on the calibration mask along X and Y axis, by the following expressions:

$$\Lambda_x = H\lambda_x \quad (32)$$

and $$\Lambda_y = \beta H\lambda_y \quad (33)$$

Finally, for a given partial image $M^{k,l}$, the absolute translation coordinates $$X_a^{k,l} \text{ and } Y_a^{k,l}$$

are obtained from the following expressions:

$$X_a^{k,l} = (k+1)\Lambda_x \text{ for } l \text{ even} \quad (34)$$

$$X_a^{k,l} = \left(k + \frac{3}{2}\right)\Lambda_x \text{ for } l \text{ odd} \quad (35)$$

and $$Y_a^{k,l} = (l+1)\Lambda_y \quad (36)$$

Returning now to FIGS. 15A and 15B, a MAPPIXEL step 280 is carried out for producing a spatial coordinates conversion table SLUT, Which is preferably a look-up table, which table corresponds to a resulting RECONS as shown at numeral 281 in FIGS. 15A and 15B. The table SLUT establishes, for subtantially each point of an optical image of the object, a spatial relationship between optical sensors upon which light emitted from this optical image point is focused and a corresponding point of a composite representation of the optical image, which is the desired final image F. First, a series of vectors are defined by:

$$V^F = \begin{bmatrix} i^F \\ j^F \end{bmatrix} V^{k,l} = \begin{bmatrix} i \\ j \end{bmatrix} V_r = \begin{bmatrix} X_r^{k,l} \\ Y_r^{k,l} \end{bmatrix} V_a = \begin{bmatrix} X_a^{k,l} \\ Y_a^{k,l} \end{bmatrix} \quad (37)$$

and a relation for initial coordinates conversion into final coordinates is given by the following mathematical expressions:

$$V^F = O(\alpha^{k,l}, \beta)(V^{k,l} - V_r) + V_a \quad (38)$$

and $$O(\alpha^{k,l}, \beta) = \begin{bmatrix} \cos\alpha^{k,l} & -\beta^{-1}\sin\alpha^{k,l} \\ \beta\sin\alpha^{k,l} & \cos\alpha^{k,l} \end{bmatrix} \quad (39)$$

wherein:

$V^{k,l}$ represents the initial coordinates (i,j,k,l) of any of said digital pixel signals designated as $$I_{i,j}^{k,l},$$

wherein i and j are spatial coordinates of a corresponding one of the optical sensors, and k and l are spatial coordinates of a corresponding one of the optical sensors;

$V^F$ represents final coordinates $(i^F, j^F)$ of any of the digital pixel signals designated as $$I_{i,j}^{k,l};$$

$O(\alpha^{k,l}, \beta)$ is a partial image rotation parameter which is function of a mean rotation angle $\alpha^{k,l}$ for any of the arrays of optical sensors having spatial coordinates k and l and of a pixel ratio β;

$h_x$ and $h_y$ are respectively physical dimensions of the optical sensors along X and Y axis of a cartesian coordinates system;

$V_r$ represents relative translation parameters $$(X_r^{k,l}, Y_r^{k,l})$$

for any of the arrays of optical sensors having spatial coordinates (k,l);

$V_\alpha$ represents absolute translation parameters $$(X_r^{k,l}, Y_r^{k,l})$$

for any of the arrays of optical sensors having spatial coordinates (k,l).

With the introduction of a real reduction parameter $\gamma \geq 1$ (binning) for compensation of holes generation which occurs during rotation, we have:

$$i^F(i,j,k,l) = \quad (40)$$
$$\text{ROUND}\left(\frac{\cos\alpha^{k,l}(i - X_r^{k,l}) - \beta^{-1}\sin\alpha^{k,l}(j - Y_r^{k,l}) + X_a^{k,l}}{\gamma}\right)$$

and:

-continued $$j^F(i, j, k, l) = \text{ROUND}\left(\frac{\beta \sin \alpha^{k,l}(i - X_r^{k,l}) + \cos \alpha^{k,l}(j - Y_r^{k,l}) + Y_a^{k,l}}{\gamma}\right) \quad (41)$$

so that we obtain for each pixel $F_{m,n}$ of a final image with reference to the $$I_{i,j}^{k,l}$$

of an initial image:

$$F_{m,n} = \sum_{i,j,k,l} I_{i,j}^{k,l} \delta_{m, i^F(i,j,k,l)} \delta_{n, j^F(i,j,k,l)} \quad (42)$$

Finally, with the hereabove relations, it is possible to obtain final image parameters as follows:

$$N_{final}^{col} = i^F(N_{pixel}^{col} - 1, 0, N_{ccd}^{col} - 1, 1) \quad (43)$$

$$N_{final}^{row} = j^F(0, N_{pixel}^{row} - 1, 0, N_{ccd}^{row} - 1) \quad (44)$$

$$N_{final} = N_{final}^{col} \times N_{final}^{row} \quad (45)$$

For the production of the spatial coordinates conversion table SLUT, it is pointed out that each pixel of the final image F is derived from a single pixel or a plurality of pixels associated to the sensors arrays. Thus, each pixel $$I_{i,j}^{k,l}$$

contributes to only one pixel $F_{m,n}$ of the final image, while one or more pixels $$I_{i,j}^{k,l}$$

can contribute to a given pixel $F_{m,n}$:

$$\left\{ I \right\} \Rightarrow \{F\} \quad (46)$$

Hence, the spatial coordinates conversion table SLUT can be produced, which associates to an address of each pixel $$I_{i,j}^{k,l}$$

of the focused partial image, a corresponding address of a pixel $F_{m,n}$ of the final image. With arranging pixels $$I_{i,j}^{k,l}$$

of focused partial images according to the following relation:

$$I(i, j, k, l) = \quad (47)$$
$$k + l \times (N_{ccd}^{col}) + i \times (N_{ccd}^{col} \times N_{ccd}^{row}) + j \times (N_{ccd}^{col} \times N_{ccd}^{row} \times N_{pixel}^{col})$$

to obtain correspondence according to the following table:

| I | j | i | l | k |
|---|---|---|---|---|
| 0 | 0 | 0 | 0 | 0 |
| ... | 0 | 0 | 0 | ... |
| $(N_{ccd}^{col})-1$ | 0 | 0 | 0 | $N_{ccd}^{col}-1$ |
| ... | 0 | 0 | ... | ... |
| $(N_{ccd}^{col} \times N_{ccd}^{row})-1$ | 0 | 0 | $N_{ccd}^{row}-1$ | $N_{ccd}^{col}-1$ |
| ... | 0 | ... | ... | ... |
| $(N_{pixel}^{col} \times N_{ccd}^{col} \times N_{ccd}^{row})-1$ | 0 | $N_{pixel}^{col}-1$ | $N_{ccd}^{row}-1$ | $N_{ccd}^{col}-1$ |
| ... | ... | ... | ... | ... |
| $(N_{pixel}^{row} \times N_{pixel}^{col} \times N_{ccd}^{col} \times N_{ccd}^{row})-1$ | $N_{pixel}^{row}-1$ | $N_{pixel}^{col}-1$ | $N_{ccd}^{row}-1$ | $N_{ccd}^{col}-1$ | and with the following inverse sequential relations in the integer space:

$$j(I) = I \text{ DIV}(N_{ccd}^{col} \times N_{ccd}^{row} \times N_{pixel}^{col}) \quad (48)$$

$$i(I, j) = (I - j \times (N_{ccd}^{col} \times N_{ccd}^{row} \times N_{pixel}^{col})) \text{DIV}(N_{ccd}^{col} \times N_{ccd}^{row}) \quad (49)$$

$$l(I, i, j) = (I - j \times (N_{ccd}^{col} \times N_{ccd}^{row} \times N_{pixel}^{col}) - i \times (N_{ccd}^{col} \times N_{ccd}^{row})) \text{DIV} N_{ccd}^{col} \quad (50)$$

$$k(I, i, j, l) = \quad (51)$$
$$I - j \times (N_{ccd}^{col} \times N_{ccd}^{row} \times N_{pixel}^{col}) - i \times (N_{ccd}^{col} \times N_{ccd}^{row}) - l \times (N_{ccd}^{col})$$

with the following relation for final image pixels:

$$F(m, n) = m + n \times N_{final}^{col} \quad (52)$$

and finally with the following inverse sequential relations in the integer space:

$$n(F) = F \text{ DIV } N_{final}^{col} \quad (53)$$

$$m(F, n) = F - n \times N_{final}^{col} \quad (54)$$

the spatial coordinates conversion table SLUT comprising $N_{pixel} \times N_{ccd}$ pairs (I,F) can be constituted using equation (42), which establishes a correspondence between focused partial images pixels and final image pixels according to the relation:

$$\{I(i,j,k,l) \to F(i^F, j^F)\} \qquad (55)$$

so that:

$$F(i^F, j^F) = i^F(i, j, k, l) + j^F(i, j, k, l) \times N_{final}^{col} \qquad (56)$$

Returning now to FIGS. 15A and 15B, the resulting RECONS 280, comprising the table SLUT, is further processed in a SORTPIXEL step 282, which eliminates from the table SLUT some of the $$I_{i,j}^{k,l}$$

to produce a reduced RECONS 288. In fact, some of the $$I_{i,j}^{k,l}$$

are physically positioned outside the projecting field area of a corresponding focusing element projecting a focused image on a corresponding optical sensors array. These pixels do not contribute to the final image and must therefore be rejected. Furthermore, the focusing elements generally form partial focused images presenting a non uniform spatial amplitude distribution, with a maximum coinciding with the center of each focusing element. Thus, pixels at the periphery of the projecting field area do not significantly contribute to increase the SNR of the final image.

Provided a white image W, represented at numeral 284 on FIGS. 15A and 15B, since each pixel of final image comprises a set $\Psi$ having $N_\Psi > 0$ pixels of focused partial images:

$$\Psi = \{I(i,j,k,l)\} \qquad (57)$$

it is possible to maximize the SNR of each pixel of the final image F by producing a new $\Psi'$ having $N_{\Psi'} \leq N_\Psi$ so that:

$$SNR_{\Psi'} > SNR_\Psi \qquad (58)$$

The simplest way for optimizing the SNR of a given final pixel consists in selecting among $\Psi$ the pixel which have the highest SNR for producing a new set $\Psi'$ with $N_{\Psi'} = 1$.

The resulting reduced RECONS 288 comprising the reduced table SLUT is then further processed in a RENORPIXEL step designated at numeral 286 in FIGS. 15A and 15B, which produce a normalization table which is used for normalizing final image pixel signals produced. The normalization table is used to produced a normalized RECONS 291. For a given optical sensor array, each pixel have its own gain and dark current noise. Spatial variations of X-rays intensities provided by the source, and non uniformity of fluorescent screen, non uniformity of optical transmission also have their effect on captured images. Regarding a single pixel, its gain does not significantly depend on temperature. In order to maximize the SNR of captured images, dark current response for each pixel of a final image is captured, and then subtracted from pixel signals after an image is captured. Such a procedure is particularly efficient because dark current varies exponentially as function to the apparatus operation temperature.

Regarding the gain, the normalization table NORM provides normalization parameter values for respectively multiplying the value of each pixel of the final image, to produce resulting pixel signals of final image which consider the relative gain of the $N_{\Psi'}$ pixels contributing to a given pixel of a final image and the dynamic range of the analog to digital converter provided in the apparatus. The normalization parameter further compensates for non uniformity of the X-rays source and for non uniformity of spatial light distribution characterizing the optical subsystem of the apparatus. Hence, with the white image W 284 as shown in FIGS. 15A and 15B, which comprises both image signals and the dark current signals, captured near the saturation of optical sensors arrays, and with the black image B 286 as shown in FIGS. 15A and 15B, captured in a same physical condition and exposure time as image W but while preventing external light from entering into the apparatus, for each pixel of focused partial image, we have:

$$N_{m,n} = \frac{2^\alpha}{(W_{m,n} - B_{m,n})} \qquad (59)$$

wherein:

$N_{m,n}$ is the normalization parameter associated with a point of the composite digital representation of the optical image identified by composite digital pixel signal coordinates m and n;

$2^\alpha$ is the dynamic range of the analog to digital converter;

$\alpha$ represents byte length in bits of said analog to digital converter;

$W_{m,n}$ is a cumulative value of at least one of the digital pixel signals corresponding to a point of the composite digital representation of the optical image identified by composite digital pixel signal coordinates m and n and produced while the corresponding optical sensors operate at near saturation by using a substantially uniform white reference optical image W;

$B_{m,n}$ is a reference offset parameter representing a cumulative value of at least one of the digital pixel signals corresponding to a point of the composite digital representation of the optical image identified by composite digital pixel signal coordinates m and n and produced while preventing external light from entering the cartridge first portion. The reference offset parameter values essentially represent dark current generated by the optical sensors in a current operating condition. Thus we have:

$$F_{m,n}^{normalized} = \text{ROUND}(N_{m,n} \times (F_{m,n} - B_{m,n})) \qquad (60)$$

After this initial calibration, the resulting normalized RECONS 291 is finally used in combination with a program MOSAIC 293 to produce a digital representation 289 of an optical image of the object 287.

Referring now to FIGS. 16A to 16K, these figures show process flow diagrams of an example of the method according to this invention for the conversion of partial images data into a final digital representation of the initial optical image using a X-rays system.

Figure 16A:
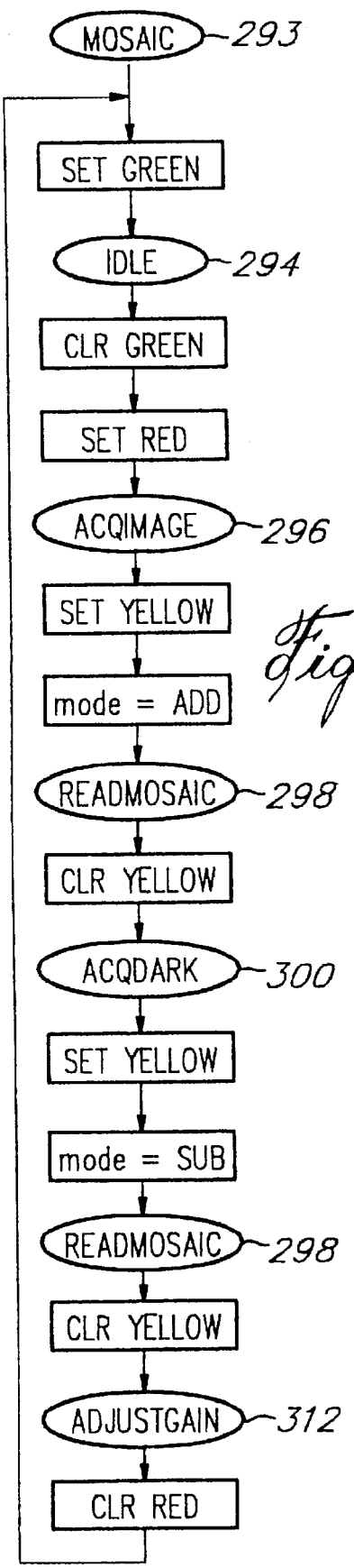
Figure 16B:
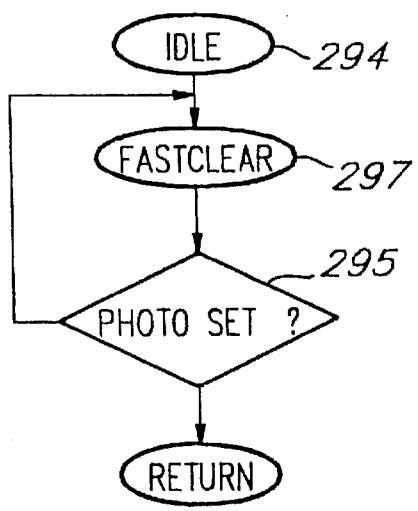

Referring now to FIG. 16A, a main subroutine MOSAIC 293 is described. After setting on a green pilot light provided on the apparatus indicating that the apparatus is ready to be operated, the main subroutine MOSAIC 293 calls for a subroutine IDLE 294 as described in FIG. 16B. The IDLE subroutine performs a FASTCLEAR subroutine 297 as shown in FIG. 16D, which repeatedly clears, from each pixel row of each CCD, accumulated charges due to dark current, so as to keep the CCD's ready to use. This initial charges clearing is successively performed through a FETCHROW step 302, as shown in FIG. 16G, for each of the "r.nbrrow" number of rows of the CCD's, as performed with the condition test step 303, as shown in FIG. 16D. The FETCHROW step provides initial clearing of the serial registers and causes charges to be transferred to the corresponding serial registers through SRG and IAG commands, as shown in FIG. 16G. The IDLE subroutine is successively performed in loop until an operator of the apparatus starts the x-ray source for a predetermined exposure time, which causes the photodiode provided on the board bearing the array of CCD's to conduct and to send a corresponding signal to the computer controller. Hence, a "set on" condition is tested at a PHOTO SET? step 295 which accordingly commands the end of execution of the subroutine IDLE 294, the process returning back to the main subroutine MOSAIC 293.

Figure 16C:
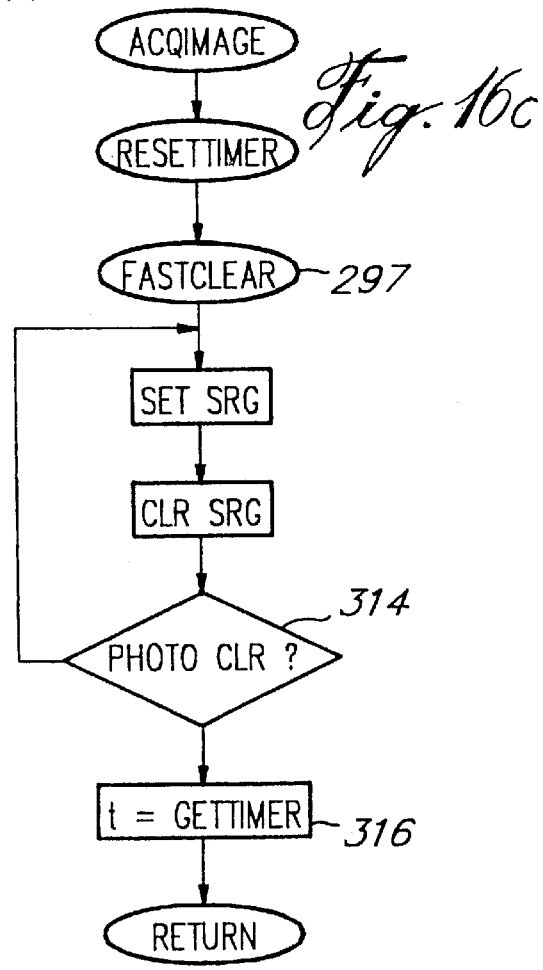
Figure 16D:
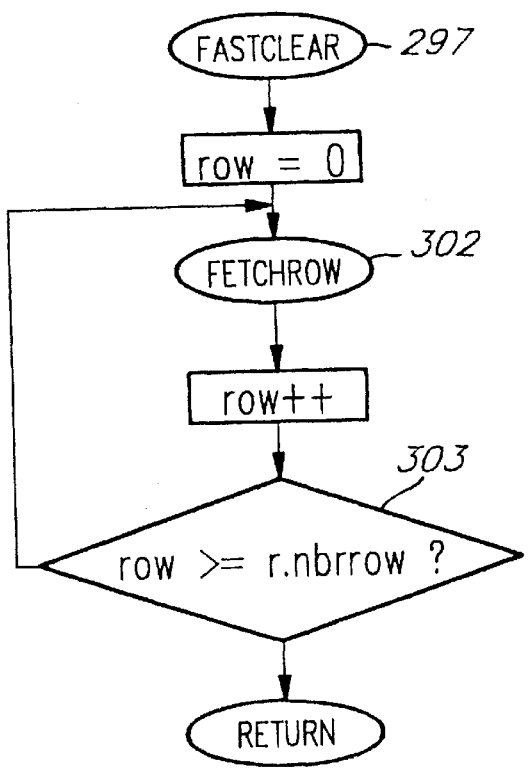
Figure 16F:
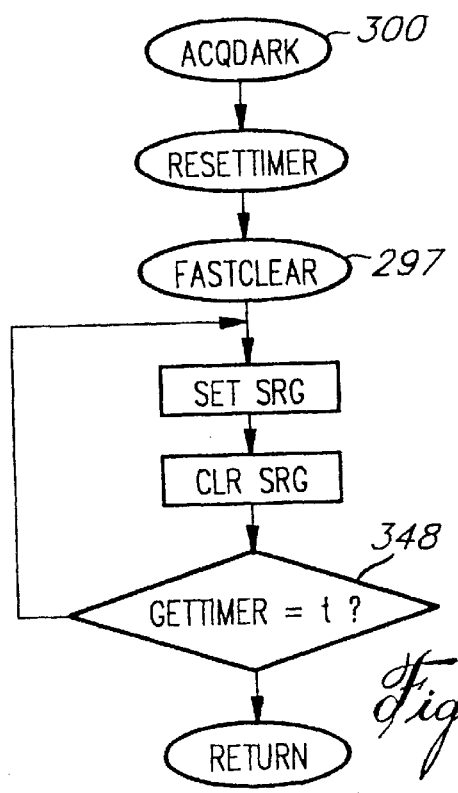

After setting off the green pilot light and setting on a red pilot light also provided in the apparatus to indicate that the apparatus is entering an acquisition mode, the main subroutine MOSAIC 293 calls for a subroutine ACQIMAGE 296, as described in FIG. 16C. After resetting an internal timer, the ACQIMAGE 296 calls for again the subroutine FAST-CLEAR 297, as shown in FIG. 16D, prior to cause the computer controller to produce a SRG clock signal clearing the serial register of each CCD during the exposition time. As soon as the photodiode switches to a clear state corresponding to the end of the current exposure, this condition being verified at a PHOTO CLR? step 314, the subroutine ACQIMAGE 296 goes on with step 316 which gives the current value of the internal timer associated with a parameter "GETTIMER" to a time parameter "t". The purpose of this "t" parameter will be later explained with reference to FIG. 16F. At the end of execution of the subroutine ACQIMAGE 296, the process returns back to the main subroutine MOSAIC 293.

Figure 16E:
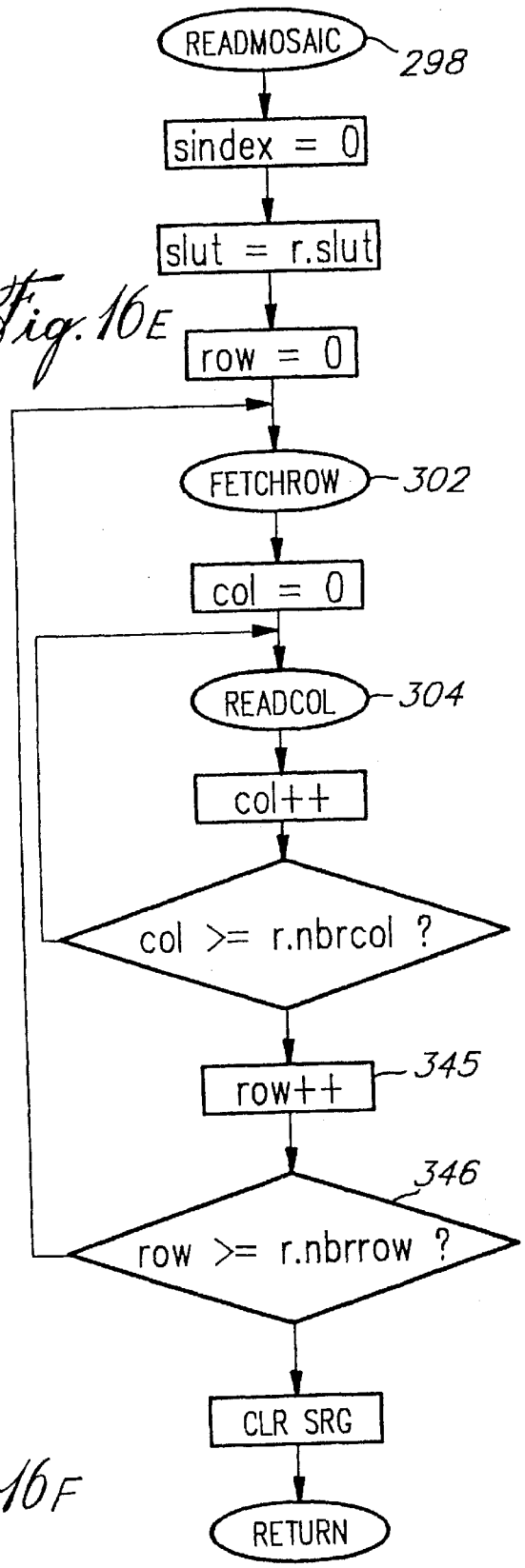
Figure 16G:
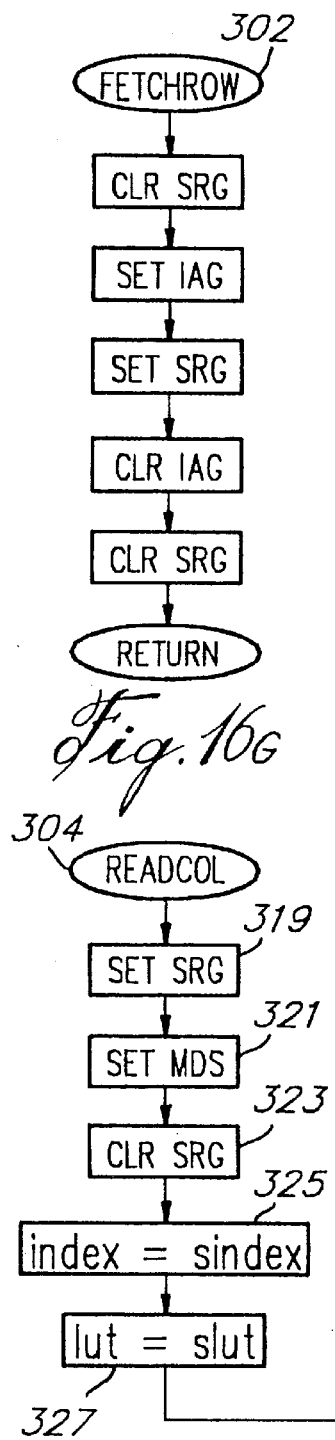
Figure 16H:
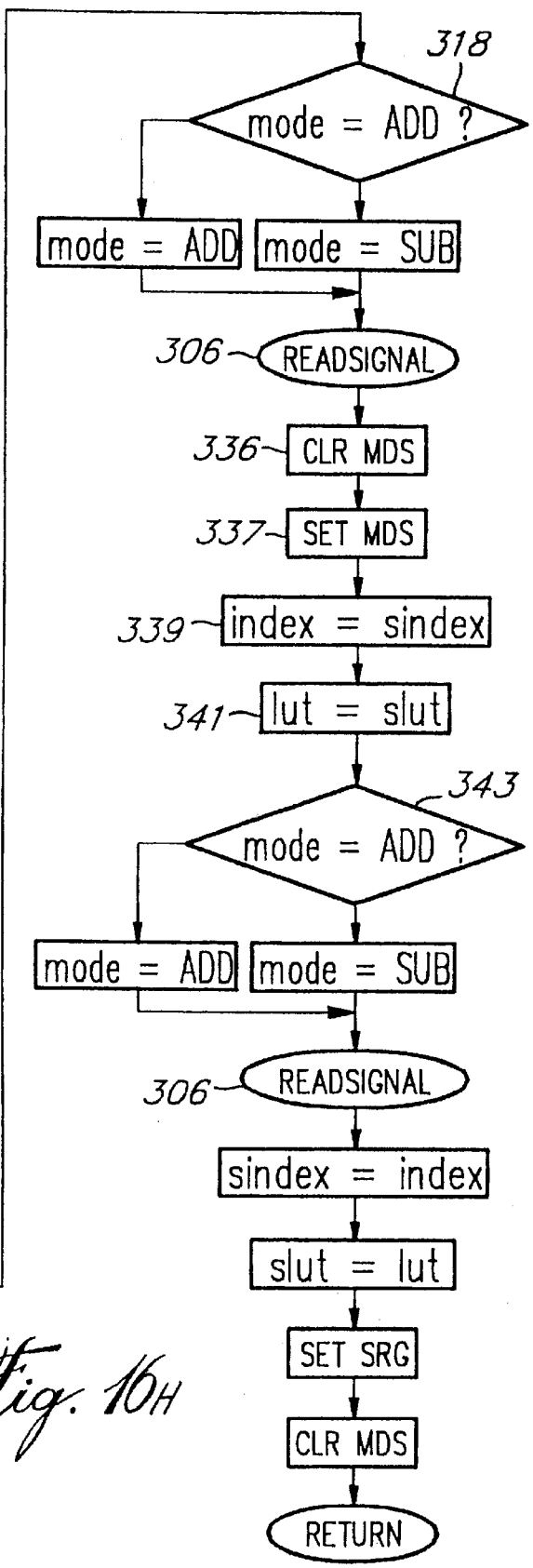

After setting on a yellow pilot light also provided in the apparatus to indicate that the apparatus is entering a reading mode, a mode parameter is given an "ADD" value, the purpose of which will be explained with reference to a following subroutine READMOSAIC 298, as shown in FIG. 16E. A counter parameter "sindex" is initially set to zero, corresponding to a first pixel to be read. Then, the table "slut" is constituted from data previously obtained through the calibration process as earlier explained, which data was previously stored in a "r.slut" table. Then, a row parameter is initialized to zero to correspond to a first pixel row to be read for all CCD's. Next, the READMOSAIC subroutine provides a main loop corresponding to successive pixel rows, which main loop comprises a subloop corresponding to successive pixel columns. The first loop calls for the subroutine FETCHROW 302, as shown in FIG. 16G, which causes charges accumulated in CCD pixels of the current first row during the exposure time to be transferred to the serial register of the corresponding CCD array. At the end of execution of the subroutine FETCHROW 302, the process returns back to subroutine READMOSAIC 298 and a column parameter "col" is initialized to zero, which corresponds to a first pixel column to be read with reference to the current first pixel row. Then a subroutine READCOL 304, as shown in FIG. 16H, is performed, which begins at steps 319, 321 and 323 with a series of SRG and MDS control signals for resetting the CCD's in a low noise reference reading mode, as earlier explained with reference to FIG. 14A. Then, at a step 325, a pixel "index" parameter is given the current value of the counter parameter "sindex", and an exchange parameter "lut" is given the current value of the table "slut" at a following step 327. Since the current value of the mode parameter is "ADD", a following condition test step 318 calls for a subroutine READSIGNAL 306, as shown in FIG. 16I, which performs, for all CCD's, reading of signals representing the reference levels characterizing the current low noise operation mode. A "ccd" counter is initialized to zero prior to perform a condition test step 320, which verifies if the current "index" parameter corresponds to elements comprised in the reduced table "slut" (or "r.slut"), which contains coordinates data related to usable pixels only, as earlier discussed. If this condition is not satisfied, the subroutine READADC with its associated subloop are skipped prior to increment the current "index" parameter at a step 333. If the prior condition is satisfied, the subroutine READSIGNAL 306 calls for a subroutine READADC 310, as shown in FIG. 16K.

After setting a "SET MUX" parameter to the current value of the "ccd" counter so as to set the multiplexer accordingly, and after setting the analog to digital converter of the apparatus by sending a CNV signal thereto, a condition test step 322 verifies the state of an end of conversion signal EOC, as earlier explained with reference to FIG. 14B. As soon as EOC indicates that a prior conversion is completed, the analog to digital converter is caused to convert parallel analog pixel signals, and at a step 324, the "pixel" parameter is set to bit values D0 to DX associated with a resulting digital pixel signal received from the ADC. Following a completed conversion, the ADC is cleared at a step 326, and at the end of execution of the subroutine READADC 310, the process returns back to the subroutine READSIGNAL 306. Then, a condition test step 328 verifies if the current "mode" parameter has a "ADD" value. Since the value of this parameter was previously changed to a "SUB" value in the calling subroutine READCOL 304, from a corresponding element of a final image vector "Imf (lut.f)", which is initially set to zero values, is subtracted the current value of the pixel parameter at step 330. Then, the current exchange parameter "lut", "index" parameter and "ccd" counter are successively incremented respectively at steps 332, 333 and 334. Then, a condition test step 336 is performed to cause the subloop beginning with the initial condition test step 320 to be repeated for all "ccd" counter values, until the current value becomes higher than a number "r.nbrccd" of CCD's to be read, and then after, the subroutine read signal 306 returns back to the subroutine READCOL 304. Then, to set the CCD's amplifiers in an image pixel charges transfer mode, a cleared MDS signal followed by a set MDS signal are successively caused to be sent to the third switcher at steps 336 and 337, as earlier explained with reference to FIG. 14B. This sequence of control signals causes the serial registers of corresponding CCD arrays to shift stored analog pixel signals one column toward an output leading to the CCD's reading areas, where they are ready to be read. It is pointed out that the MDS step 337 is not essential and can accordingly be omitted in most cases. Then, at step 339, a "pixel" parameter is given the current value of the counter parameter "sindex", and an exchange parameter "lut" is given the current value of the table "slut" at a following step 341. Since the current value or the mode parameter is still SUB, the following condition test step 343 is not satisfied, and the "mode" parameter is given accordingly an "ADD" value. Then, the subroutine READCOL 304 calls again for the subroutine READSIGNAL 306, which is performed in the same way as earlier explained, excepted for the result of condition test step 328, where to a corresponding element of a final image summed intensity vector "Imf (lut.f)" is added the current value of the current "pixel" parameter at a step 331, since the "mode" parameter was previously changed to a "ADD" value. Accordingly, at the end of the subroutine READSIGNAL 306, the final image summed intensity vector contains digital pixel signals values from which CCD arrays reference output signals have been subtracted. Returning to the subroutine READCOL 304, the "sindex" and "slut" parameters are then respectively set to current values of "index" and "lut" parameters, and SRG and MDS are set to their initial values. In the case where MDS has not been set prior to the second call of the subroutine READSIGNAL 306, the clearing of MDS is not required. At the end of execution of the subroutine READCOL 304, the process returns back to the subroutine READMOSAIC 298, and the column parameter "col" is incremented at a step 345 before performing a condition test step 346 which verifies if the column parameter "col" is higher than a "r.nbrcol" parameter representing the maximum number of pixel columns per CCD array. If this condition is not satisfied, the READCOL subroutine 304 is repeated according to the current incremented column parameter, to complete the production of the final image intensity vector. Finally, after clearing the SRG signal, the subroutine READMOSAIC returns back to the main subroutine MOSAIC 293.

After setting off the yellow pilot light to indicate that the apparatus is no longer in a reading mode, the main subroutine MOSAIC 293 calls for a subroutine ACQDARK 300 as described in FIG. 16F, which is performed while preventing light from reaching the optical sensor's arrays during a dark exposure time, whereby causing each CCD sensor to accordingly accumulate charges corresponding to the dark current characterizing each CCD sensor in a current operating condition. From each resulting pixel charge an offset parameter associated with each pixel is obtained, which is then subtracted from a respective final image summed intensity vector element for the corresponding CCD sensor, to obtain an offset rectified final image intensity vector.

It is pointed out that instead of performing such a dark current measurement just after an image exposure and reading sequence as proposed in a particular example as shown in FIGS. 16A to 16K, in another example (not shown), one could propose to successively perform dark current charges measurements while the apparatus is in an idle mode of operation, to obtain a continuously updated offset parameter values. After resetting the internal timer, the subroutine ACQDARD 300 calls for the subroutine FASTCLEAR 297 which is performed in the same manner as earlier explained. At the end of execution of subroutine FASTCLEAR 297, the process returns back to the subroutine ACQDARK 300, which causes the computer controller to produce a SRG clock signal to clear the serial register of each CCD during a period of time equal to the exposure time. Then, a condition test step 348 verifies if the "GETTIMER" parameter is equal to the time parameter "t" corresponding to the exposure time. As soon as this condition is satisfied, the serial registers clearing is interrupted, and the process returns back to the main subroutine MOSAIC 293. After resetting on the yellow pilot lamp to indicate that the apparatus has switched to a reading mode, the main subroutine MOSAIC 293 again calls for the subroutine READMOSAIC 298, just after resetting the mode parameter to a "SUB" value. In this way, the subroutine READMOSAIC 298 is performed in essentially the same manner as earlier explained, excepted that switching of the mode parameter from "ADD" to "SUB" causes the reference offset parameter values to be respectively subtracted from corresponding elements of the final image summed intensity vector, to obtain a rectified final image intensity vector containing elements associated with each point of the visible image to be digitally converted. After this second execution of the subroutine READMOSAIC 298, the process returns back to the main subroutine MOSAIC 293. After setting off the yellow pilot lamp to indicate that the apparatus is no longer in a reading mode, the main subroutine MOSAIC 293 calls for a subroutine ADJUSTGAIN 312, as shown in FIG. 16J, which performs a normalization of the digital pixel signal values contained in the final image summed intensity vector, using normalization parameter values contained in a normalization table or vector "r.norm (i)", which normalization parameter considering the relative gain of the $N_{tp}$, pixels contributing to a given pixel of a final digital image, as earlier discussed. After resetting the "index" parameter to zero, each element of the final image summed intensity vector is multiplied by its respective normalization parameter contained in the vector "r.norm(i)" at a step 350, thereby producing composite digital pixel signal values associated with respective points of the optical image that was converted. The "index" parameter is then incremented at a step 352. As soon as the current index parameter value is higher than the number "r.nf" of element contained in the final image summed intensity value as tested at a condition test step 354, the process returns back to the main subroutine MOSAIC 293, which sets off the red pilot lamp to indicate that the apparatus is in turned off mode. The process ends out with a final image summed intensity vector containing digital pixel signals, which vector form a composite digital representation of the initial optical image, as provided by the present invention.

What is claimed is:

1. A method applicable in an apparatus for converting an optical image of an object in a first plane into a digital representation of said optical image, said apparatus comprising a two-dimensional array of focusing elements lying in a second plane spaced from said first plane in a parallel relationship, wherein each of said focusing elements has a field of vision intersecting an area of said optical image, and wherein adjacent ones of said focusing elements have fields of vision intersecting mutually overlapping areas of said optical image, whereby substantially the entirety of said optical image is covered by combined fields of vision of said focusing elements; said apparatus further comprising a two-dimensional array of optical sensors arrays mounted on a board provided in said apparatus, said array of optical sensors arrays lying in a third plane spaced from said array of focusing elements in a parallel relationship and in opposite side thereof with respect to said first plane, each of said optical sensors arrays being optically associated with a respective one of said focusing elements, whereby at least a portion of light emitted during an exposure time from an area of said optical image corresponding with one of said focusing elements and traversing therethrough is focused onto the associated optical sensors array so as to ensure that light emitted from substantially each point of said optical image is focused on at least one of said optical sensors, said apparatus comprising a computer memory; said method comprising the steps of:

i) providing a converting table stored in said computer memory establishing for substantially each point of said optical image a spatial relationship between said at least one of said optical sensors upon which light emitted from said point is focused and a corresponding point of a composite digital representation of said optical image;

ii) producing from each of said optical sensors arrays a group of pixel analog signals representing a partial image associated with the corresponding area of said optical image;

iii) converting said group of analog pixel signals associated with each of said optical sensors arrays to a corresponding group of digital pixel signals for each of said optical sensors arrays;

iv) forming said composite digital representation of said optical image by using said table to convert said groups of digital pixel signals into composite digital pixel signals associated with respective points of said composite digital representation of said optical image; and wherein said table is obtained from the following mathematical expressions:

$$V^F = \begin{bmatrix} i^F \\ j^F \end{bmatrix} = O(\alpha^{k,l}, \beta)(V^{k,l} - V_r) + V_a$$

$$O(\alpha^{k,l}, \beta) = \begin{bmatrix} \cos\alpha^{k,l} & -\beta^{-1}\sin\alpha^{k,l} \\ \beta\sin\alpha^{k,l} & \cos\alpha^{k,l} \end{bmatrix}$$

$$\beta = \frac{h_x}{h_y}$$

in which:

$V^{k,l}$ represents the initial coordinates (i,j,k,l) of any of said digital pixel signals designated as $$I_{i,j}^{k,l},$$

wherein i and j are spatial coordinates of a corresponding one of said optical sensors, k and l are spatial coordinates of a corresponding one of said arrays of optical sensors;

$V^F$ represents final coordinates ($i^F, j^F$) of any of said digital pixel signals $$I_{i,j}^{k,l};$$

$O(\alpha^{k,l}, \beta)$ is a partial image rotation parameter which is function of a mean rotation angle $\alpha^{k,l}$ for any of said arrays of optical sensors having spatial coordinates k and l and of a pixel ratio $\beta$;

$h_x$ and $h_y$ are respectively physical dimensions of said optical sensors along X and Y axis of a cartesian coordinates system;

represents relative translation parameters $$(X_r^{k,l}, Y_r^{k,l})$$

for any of said arrays of optical sensors having spatial coordinates (k,l);

$V_\alpha$ represents absolute translation parameters $$(X_r^{k,l}, Y_r^{k,l})$$

for any of said arrays of optical sensors having spatial coordinates (k,l).

2. A method as claimed in claim 1, wherein said computer memory further stores normalization parameter values respectively for substantially each point of said composite digital representation of said optical image, said step iv) comprising:

a) summing value of each digital pixel signal produced by said at least one of said optical sensors to produce a summed value associated with substantially each point of said composite digital representation of said optical image; and b) multiplying said summed value associated with substantially each point of said composite digital representation of said optical image by said corresponding normalization parameter value to produce said corresponding composite digital pixel signal.

3. A method as claimed in claim 1, wherein said step iv) comprising selecting one of said at least one of said optical sensors associated with substantially each point of said composite digital representation of said optical image and using a corresponding one of said digital pixel signal to produce said corresponding composite digital pixel signal.

4. A method as claimed in claim 3, wherein said computer memory further stores normalization parameter values respectively for substantially each point of said composite digital representation of said optical image, said step iv) comprising multiplying said corresponding one of said digital pixel signal by said corresponding normalization parameter value to produce said corresponding composite digital pixel signal.

5. A method as claimed in claim 3, wherein said computer memory further stores normalization parameter values respectively for substantially each point of said composite digital representation of said optical image, said computer memory further stores reference offset parameter values $B_{m,n}$ each representing a value of one of said digital pixel signals corresponding to a point of said composite digital representation of said optical image identified by composite digital pixel signal coordinates m and n and produced while preventing external light from entering the cartridge first portion, said reference offset parameter value essentially representing dark current generated by said one of said at least one of said optical sensors in a current operating condition; and wherein said step iv) further comprises the steps of:

a) subtracting from said corresponding one of said digital pixel signal said corresponding reference offset parameter value to produce a rectified value associated with substantially each point of said composite digital representation optical image; and b) multiplying said rectified value by said corresponding normalization parameter value to produce said corresponding composite digital pixel signal.

6. A method as claimed in claim 5, wherein said normalization parameter is defined by:

$$N_{m,n} = \frac{2^a}{(W_{m,n} - B_{m,n})}$$

wherein:

$N_{m,n}$ is said normalization parameter associated with a point of said composite digital representation of said optical image identified by composite digital pixel signal coordinates m and n;

$2^\alpha$ is the dynamic range of said analog to digital converter;

$\alpha$ represents byte length in bits of said analog to digital converter;

$W_{m,n}$ is a value of one of said digital pixel signals corresponding to a point of said composite digital representation of said optical image identified by composite digital pixel signal coordinates m and n and produced while said corresponding one of said at least one of said optical sensors operates at near saturation thereof by using a substantially uniform white reference optical image;

$B_{m,n}$ is said reference offset parameter.

7. A method as claimed in claim 3, wherein said computer memory further stores a normalization parameter associated with substantially each point of said composite digital representation of said optical image, wherein after said step ii) there is further provided the steps of:
  a) preventing light from entering said cartridge first portion during a dark exposure time substantially equal to said exposure time;
  b) producing from each of said optical sensors arrays a group of pixel analog signals representing a partial black image associated with the corresponding area of said optical image;
  c) using said table to derive from said pixel analog signals offset parameter values $B_{m,n}$ each representing a value of one of said digital pixel signals corresponding to a point of said composite digital representation of said optical image identified by composite digital pixel signal coordinates m and n, said reference offset parameter value essentially representing dark current generated by said one of said at least one of said optical sensors in a current operating condition;.
  d) incorporating into said computer memory said reference offset parameter values;
  e) successively repeating said steps a) to d) while said apparatus is in an idle mode of operation, whereby said reference offset parameter values are continuously updated in said computer memory;
and wherein said step iv) further comprises the steps of:
  f) subtracting from said corresponding one of said digital pixel signal said corresponding reference offset parameter value to produce a rectified value associated with substantially each point of said composite digital representation of said optical image; and
  g) multiplying said rectified value by said corresponding normalization parameter value to produce said corresponding composite digital pixel signal.

8. A method as claimed in claim 3, wherein said memory further stores normalization parameter values respectively for substantially each point of said composite digital representation of said optical image, wherein after said step i) there is further provided the steps of:
  a) preventing light from entering said cartridge first portion during a dark exposure time substantially equal to said exposure time;
  b) producing from each of said optical sensors arrays a group of pixel analog signals representing a partial black image associated with the corresponding area of said optical image;
  c) using said table to derive from said pixel analog signals reference offset parameter values $B_{m,n}$ each representing a value of one of said digital pixel signals corresponding to a point of said composite digital representation of said optical image identified by composite digital pixel signal coordinates m and n, said reference offset parameter value essentially representing dark current generated by said one of said at least one of said optical sensors in a current operating condition;
  d) incorporating into said computer memory said offset parameter values;

and wherein said step iv) further comprises the steps of:
  e) subtracting from said corresponding one of said digital pixel signal said corresponding reference offset parameter value to produce a rectified value associated with substantially each point of said composite digital representation of said optical image; and
  f) multiplying said rectified value by said corresponding normalization parameter value to produce said corresponding composite digital pixel signal.

9. A method as claimed in claim 1, wherein said memory further stores normalization parameter values respectively for substantially each point of said composite digital representation of said optical image, said memory further stores reference offset parameter values $B_{m,n}$ representing a cumulative value of at least one of said digital pixel signals corresponding to a point of said composite digital representation of said optical image identified by composite digital pixel signal coordinates m and n and produced while preventing external light from entering the cartridge first portion, said reference offset parameter values essentially representing dark current generated by said at least one of said optical sensors in a current operating condition, wherein said step iv) comprises:
  a) summing value of each digital pixel signal produced by said at least one of said optical sensors to produce a summed value associated with substantially each point of said composite digital representation of said optical image;
  b) subtracting from said summed value said corresponding reference offset parameter value to produce a rectified summed value associated with substantially each point of said composite digital representation of said optical image; and
  c) multiplying said rectified summed value by said corresponding normalization parameter value to produce said corresponding composite digital pixel signal.

10. A method as claimed in claim 9 wherein said normalization parameter is defined by:

$$N_{m,n} = \frac{2^\alpha}{(W_{m,n} - B_{m,n})}$$

wherein:

$N_{m,n}$ is said normalization parameter associated with a point of said composite digital representation of said optical image identified by composite digital pixel signal coordinates m and n;

$2^\alpha$ is the dynamic range of said analog to digital converter;

$\alpha$ represents byte length in bits of said analog to digital converter;

$W_{m,n}$ is a cumulative value of at least one of said digital pixel signals corresponding to a point of said composite digital representation of said optical image identified by composite digital pixel signal coordinates m and n and produced while said corresponding at least one of said optical sensors operates at near saturation thereof by using a substantially uniform white reference optical image;

$B_{m,n}$ is said reference offset parameter.

11. A method as claimed in claim 1, wherein said memory further stores normalization parameter values respectively for substantially each point of said composite digital representation of said optical image, wherein after said step ii) there is further provided the steps of:

a) preventing light from entering said cartridge first portion during a dark exposure time substantially equal to said exposure time.

b) producing from each of said optical sensors arrays a group of pixel analog signals representing a partial black image associated with the corresponding area of said optical image;

c) using said table to obtain from said pixel analog signals reference offset parameter values $B_{m,n}$ representing a cumulative value of at least one of said digital pixel signals corresponding to a point of said composite digital representation of said optical image identified by composite digital pixel signal coordinates m and n, said reference offset parameter values essentially representing dark current generated by said at least one of said optical sensors in a current operating condition;

d) incorporating into said computer memory said reference offset parameter values;

and wherein said step iv) comprises:

e) summing values of each digital pixel signal produced by said at least one of said optical sensors to produce a summed value associated with substantially each point of said composite digital representation of said optical image;

f) rectifying said summed value by subtracting from value of each of said composite digital pixel signals said corresponding offset parameter value; and g) multiplying said rectified summed value associated with substantially each point of said composite digital representation of said optical image by said corresponding normalization parameter value to produce said corresponding composite digital pixel signal.

12. A method as claimed in claim 1, wherein said memory further stores normalization parameter values respectively for substantially each point of said composite digital representation of said optical image, wherein after said step i) there is further provided the steps of:

a) preventing light from entering said cartridge first portion during a dark exposure time substantially equal to said exposure time;

b) producing from each of said optical sensors arrays a group of pixel analog signals representing a partial black image associated with the corresponding area of said optical image;

c) using said table to derive from said pixel analog signals offset parameter values $B_{m,n}$ representing a cumulative value of at least one of said digital pixel signals corresponding to a point of said composite digital representation of said optical image identified by composite digital pixel signal coordinates m and n, said reference offset parameter values essentially representing dark current generated by said at least one of said optical sensors in a current operating condition;

d) incorporating into said computer memory said offset parameter values corresponding with substantially each point of said composite digital representation of said optical image;

e) successively repeating said steps a) to d) while said apparatus is in an idle mode of operation, whereby said offset parameter values are continuously updated in said computer memory;

and wherein said step iv) comprises:

f) summing values of each digital pixel signal produced by said at least one of said optical sensors to produce a summed value associated with substantially each point of said composite digital representation of said optical image;

g) rectifying said summed value by subtracting from values of each of said composite digital pixel signals said corresponding offset parameter value; and h) multiplying said rectified summed value associated with substantially each point of said composite digital representation of said optical image by said corresponding normalization parameter value to produce said corresponding composite digital pixel signal.

13. A method as claimed in claim 1, wherein each of said optical sensors arrays has its center being substantially aligned with a center of a corresponding one of said focusing elements, in a direction substantially normal to said second and third planes.

14. A method as claimed in claim 1, wherein said spatial relationship is determined using a calibration pattern.

15. A method as claimed in claim 14 wherein said calibrating pattern is an array of figures, wherein each of said figures is aligned with a center of a respective one of said optical sensors arrays.

* * * * *